United States Patent [19]
Nakajima et al.

[11] Patent Number: 5,341,641
[45] Date of Patent: Aug. 30, 1994

[54] DUAL SENSOR TYPE AIR FUEL RATIO CONTROL SYSTEM FOR INTERNAL COMBUSTION ENGINE

[75] Inventors: Yuki Nakajima; Masaaki Uchida, both of Kanagawa, Japan

[73] Assignee: Nissan Motor Co., Ltd., Yokohama, Japan

[21] Appl. No.: 705,819

[22] Filed: May 28, 1991

[30] Foreign Application Priority Data

May 28, 1990 [JP] Japan .................................. 2-137854

[51] Int. Cl.$^5$ .............................................. F01N 3/20
[52] U.S. Cl. ........................................ 60/274; 60/276; 60/285; 123/674; 123/691
[58] Field of Search ...................... 60/274, 276, 285; 123/674, 691

[56] References Cited

U.S. PATENT DOCUMENTS

| | | | |
|---|---|---|---|
| 3,939,654 | 2/1976 | Creps ................................ | 123/691 X |
| 4,751,908 | 6/1988 | Abe .................................... | 123/674 |
| 4,796,425 | 1/1989 | Nagai et al. ......................... | 60/274 |
| 4,913,122 | 4/1990 | Uchida et al. ....................... | 123/674 |

FOREIGN PATENT DOCUMENTS 58-72647  4/1983  Japan .
1-113552  5/1989  Japan .

Primary Examiner—Douglas Hart
Attorney, Agent, or Firm—Lowe, Price, LeBlanc & Becker

[57] ABSTRACT

When engine operation falls in a predetermined zone wherein it is necessary to attenuate engine surging or the like type of engine operating phenomenon, and wherein mapped adaptive update value data is required to exhibit a different resolution to the adaptive update value data which is contained in the remainder of the map not included in the predetermined zone, the operation of the engine in the predetermined zone is detected and an indication of the same set. While the indication is set, updating of the mapped data which corresponds to the predetermined operational zone, is inhibited. In some embodiments mapped data which corresponds to the predetermined operational zone is set in a separate memory section and updated in a manner different from the manner in which the data which does not correspond to the special zone, is updated.

31 Claims, 22 Drawing Sheets

DUAL SENSOR TYPE AIR FUEL RATIO CONTROL SYSTEM FOR INTERNAL COMBUSTION ENGINE

BACKGROUND OF THE INVENTION

1. Field of the Invention

The present invention relates generally to an air/fuel ratio control system for an internal combustion engine and more specifically to an air-fuel ratio control system which utilizes the output of a dual oxygen concentration sensor arrangement to achieve feedback control of the fuel supply system.

2. Description of the Prior Art

The use of a so called three-way catalytic converter in an automotive exhaust system is well known. However, in order to achieve the simultaneous reduction of HC, CO and NOx, it is necessary to maintain the air-fuel mixture supplied to the combustion chamber or chambers of the engine at or very close to the stoichiometric air-fuel ratio (A/F) in order to maximize the conversion efficiency. The use of $O_2$ sensors for this purpose is also widely known.

However, as the output characteristics Of $O_2$ sensors vary from one sensor to another, a problem is encountered in that the unit to unit deviations in the sensors induce errors in the feedback control of the fuel supply whereby the stoichiometric air-fuel ratio is not maintained in the desired manner and the efficiency of the three-way conversion in the catalytic converter is inhibited.

To overcome this problem is has been proposed in JP-A-58-72647 to use two $O_2$ sensors. One of the sensors is disposed in an exhaust conduit upstream of a 3-way catalytic converter while the other is disposed downstream thereof. The outputs of the two $O_2$ sensors are fed to a control unit which in turn controls the amount of fuel injected by a fuel injector disposed in the engine induction system.

Similar arrangements are also disclosed in JP-A-1-113552 and U.S. Pat. No. 3,939,654 issued on Feb. 24, 1976 in the name of Creps.

An example of the control implemented in connection with this type of system is depicted in flow chart form in FIGS. 23 and 24. The routine depicted in FIG. 23 is such as to utilize the output VFO of the upstream $O_2$ sensor to determine a feedback control factor $\alpha$ and is run at predetermined intervals (e.g. 4 ms) The first step of this routine is such as to determine if conditions (referred to as FRONT $O_2$ F/B) which permit the use of the upstream side $O_2$ sensor exist or not.

In the event that such conditions exist, for example: if the temperature of the engine coolant is not below a predetermined level of Tw; the engine is not being cranked/started; the engine has not just been started; the air-fuel mixture is not being deliberately enriched for engine warm-up; the output of the upstream $O_2$ sensor has not yet switched from one level to another; or the engine is not undergoing a fuel cut, then it is deemed that conditions which enable the use of the sensor exist and the routine should flow to step S2. In this step the output OSR1 of the upstream $O_2$ sensor is subject to A/D conversion, read and the value set in memory. In step S3 the instant value of OSR1 is compared with a slice level SLF (e.g. 0.45 volt) which is selected to represent, the air/fuel ratio. In the event that the outcome is such as to indicate that VFO≧SLF (viz., lean) the routine goes to step S4 wherein a flag F1 is cleared (i.e. F1=0), while in the event that VFO>SLF the routine proceeds to step S5 wherein flag F1 is set (F1=1).

As will be appreciated flag F1 is such as to indicate if the air-fuel mixture is richer or leaner than stoichiometric value. F1=0=lean, F1=1 rich.

In steps S6 to S8 the status of F1 for this run is compared with that of the previous one in manner to establish four possible paths for the routine to follow to one of steps S9 to S12. In these latter mentioned four steps an air/fuel ratio feedback correction factor $\alpha$ is subject to the following methods of derivation:

(i) In the case the routine flows from S6→S7→S9 the air-fuel ratio is indicated as just having undergone a rich lean change and $\alpha$ is derived by incrementing the instant value by a proportional component PL ($\alpha=\alpha+PL$). This tends to incrementally enrich the air/fuel mixture and thus shift the air-fuel ratio stepwisely back toward the stoichiometric value.

(ii) In the case the routine follows a S6→S7→S10 path, the air-fuel mixture is indicated as just having undergone a lean→rich change. Accordingly $\alpha$ is derived by decrementing the instant value by a proportional component PR ($\alpha=\alpha-$ PR). This tends to stepwisely lean the mixture back from the rich side.

(iii) In the case of a S6→S8→S11 flow, a previously lean condition is again detected and the value of $\alpha$ is derived by adding an integrated component IL. This induces the A/F to return gradually toward the rich side.

(iv) In the event of a S6→S8→S11 flow, a previously rich condition is again detected and the value of $\alpha$ is derived by subtracting an integrated component IR. This induces the A/F to return gradually toward the lean side.

The flow chart shown in FIG. 24 depicts a routine which utilizes the output of the downstream $O_2$ sensor for deriving an $\alpha$ correction. This routine is run at predetermined intervals of 512 ms (for example). The reason for this relatively long delay between runs is to ensure that the feedback control which is primarily based on the output of the upstream $O_2$ sensor (which is highly responsive to the changes in A/F) is not dulled by overly frequent application of the output of the downstream $O_2$ sensor which, due to its position downstream of the catalytic converter, is more remote and much less responsive to changes in the air-fuel mixture being combusted in the combustion chamber(s) of the engine.

At steps S21–S25 the status of the downstream $O_2$ sensor is checked to determine if the output (REAR $O_2$ F/B) can be used for feedback control purposes. The output of the downstream $O_2$ sensor is deemed to be unsuitable for feedback control correction when the conditions which effect the upstream sensor are found to be unsuitable; when the engine coolant temperature is found to be less than Tw (in this case 70° C.) step S22; when the engine throttle opening LL is is fully opened (LL=1) - step S23; when the engine load/engine speed ratio Qa/Ne<X1-step S24; or when in step S25 the downstream $O_2$ sensor is found not to have been activated.

In the event that the appropriate requirements can be met, indicating that conditions wherein the output of the downstream 02 sensor can relied upon, the routine goes to step S26 wherein the output of the same VRO is A/D converted, read and set in memory. At step S27 the instant value of VRO is compared with a slice level SLR. In this instance the slice level is selected to represent the stoichiometric air-fuel ratio (e.g. 0.55 volt). In the event that it is found that the VRO≦SLR the air-fuel mixture is deemed to be on the lean side and the routine flows to steps S28–S31. On the other hand, if VRO<SLR the mixture is indicated as being on the rich side and the routine is directed to steps S32 to S35.

It should be noted that as the slice level SLR is set a little higher than SLF due to the fact that gases upstream and downstream of the catalytic converter are different and induce the sensors to exhibit slightly different output characteristics and to also allow for the different degradation rates between the two sensors.

At step S28 the PL value is incremented by a fixed value ΔP (Viz., ΔPL (PL=PL+ΔPL). At step S29 the value of PR is decremented by a fixed value ΔPR (PR=PR−ΔAPR. This has the effect of shifting the overall A/F in the rich direction.

At step S30 a constant value ΔIL is subtracted from the integrated component IL in order to reduce the amplitude at which α increases as a result of the increase of PL in step S28. At step S31, a constant value ΔIR is added to the integrated component IR in order to reduce the delay with which the output of the upstream O2 sensor switches from rich to lean, it being noted that this delay is induced by the increase in the PR value in step S29.

When the A/F is indicated by the output of the upstream O2 sensor to be on the lean side, α correction control is implemented in steps S28 to S31.

FIG. 25 shows a routine which is run at predetermined crankshaft rotation angle intervals (e.g. 30° CA-)and which is used to derive the fuel injection pulse width Ti [ms]. The first step S41 is such as to derive the basic injection pulse width Tp by table look-up using data which is recorded in terms of engine speed and the engine load. Following this in step S42, the sum of a plurality of correction factors (e.g. engine temperature related correction factor KTW) is calculated and at step S43 the actual injection pulse width Ti is derived using the equation:

$$Ti = Tp \times Co \times \alpha + Ts \quad (1)$$

where Ts denotes the rise time of the fuel injector(s).

In step S44 the derived value of Ti is set in memory and used to produce the appropriate injection pulse(s).

However, the above type of air-fuel ratio control is such that the proportional component values (Pr, PL) used therein are obtained from mapped data wherein, in order to prevent engine surging, the data which falls in a predetermined special zone, is required to exhibits a particularly fine resolution (viz., changes in small increments). On the other hand, in order to render the adaptive or self-updating control more dynamic, the resolution of the data in updating zones is reduced.

In the event that, as shown in FIG. 15, the special zone (cross hatched) is smaller than one of the four updating zones A–D, a problem is encountered in that as the special zone is located in zone D, in the case the data is read out of the special zone on one or more runs of the control program(s) and then is read out of the zone D' (the zone surrounding the special zone) a sudden change in the correction amount is apt to be induced and result in the deterioration of the emission control. To overcome this, it is possible to increase the resolution of the updating data, however, this requires a larger amount of ROM area.

A further problem is encountered in that, as the special zone overlaps part of the updating or adaptive zone, the updating zone is reduced and thus reduces the chances (frequency) of the updating process being carried out.

SUMMARY OF THE INVENTION

It is an object of the present invention to provide a air-fuel ratio control system of the above described nature wherein it is possible to provide mapped data which includes a special anti engine surge control zone or the like, which does not require a large increase the amount of memory space and which simultaneously ensures that the required updating frequency can be achieved without encountering sudden deteriorations in the air-fuel ratio control and corresponding lowering of the catalytic converter emission reduction.

In brief, the above object is achieved by an arrangement wherein when the engine operation falls in a predetermined zone wherein it is necessary to attenuate engine surging or the like type of engine operating phenomenon, and wherein mapped adaptive update value data is required to exhibit a different resolution to the adaptive update value data which is contained in the remainder of the map not included in the predetermined zone, the operation of the engine in the predetermined zone is detected and an indication of the same set. While the indication is set, updating of the mapped data which corresponds to the predetermined operational zone, is inhibited. In some embodiments mapped data which corresponds to the predetermined operational zone is set in a separate memory section and updated in a manner different from the manner in which the data which does not correspond to the special zone, is updated.

More specifically, a first aspect of the present invention comes in an internal combustion engine air-fuel ratio control apparatus which features: sensor means for sensing engine speed and engine load; a catalytic converter disposed in an exhaust gas conduit; a first air-fuel ratio sensor disposed in the exhaust gas conduit upstream of the catalytic converter; a second air-fuel ratio sensor disposed in the exhaust gas conduit downstream of said catalytic converter; fuel injection means for supplying fuel into the engine; a control circuit operatively connected with said sensor means and said fuel injector means, said control circuit including circuitry for: using the output of said sensor means to determine a basic injection pulse width; determining an air-fuel ratio feedback control factor value based on the output of said first air-fuel ratio sensor; determining an actual pulse width by correcting the basic pulse width using air-fuel ratio feedback control factor; modifying air-fuel ratio feedback control factor using an adaptive updating value adaptive update value which is read out of memory in a first predetermined manner, based on the instant engine speed and load, and updated based on the output of said second air-fuel ratio sensor; and inhibiting the updating of adaptive update value in the event that the output of said sensor means indicates that the engine is operating in a predetermined zone.

A second aspect of the present invention comes in a method of controlling the air-fuel ratio of an air-fuel mixture supplied to an internal combustion engine, which method features: sensing engine speed and engine load; sensing the air-fuel ratio at a location upstream of a catalytic converter using a first air-fuel ratio sensor;

sensing the air-fuel ratio at a location downstream of a catalytic converter using a second air-fuel ratio sensor; supplying fuel into the engine; using the air-fuel ratio sensed at the location upstream of the catalytic converter to determine a basic injection pulse width; determining an air-fuel ratio feedback control factor value based on the output of said first air-fuel ratio sensor; determining an actual pulse width by correcting the basic pulse width using air-fuel ratio feedback control factor; modifying air-fuel ratio feedback control factor using an adaptive updating value adaptive update value which is read out of memory, in a first predetermined manner based on the instant engine speed and load, and updated based on the output of said second air-fuel ratio sensor; and inhibiting the updating of adaptive update value in the event that the output of said sensor means indicates that the engine is operating in a predetermined zone.

DETAILED DESCRIPTION OF THE PREFERRED EMBODIMENTS

Figure 1:
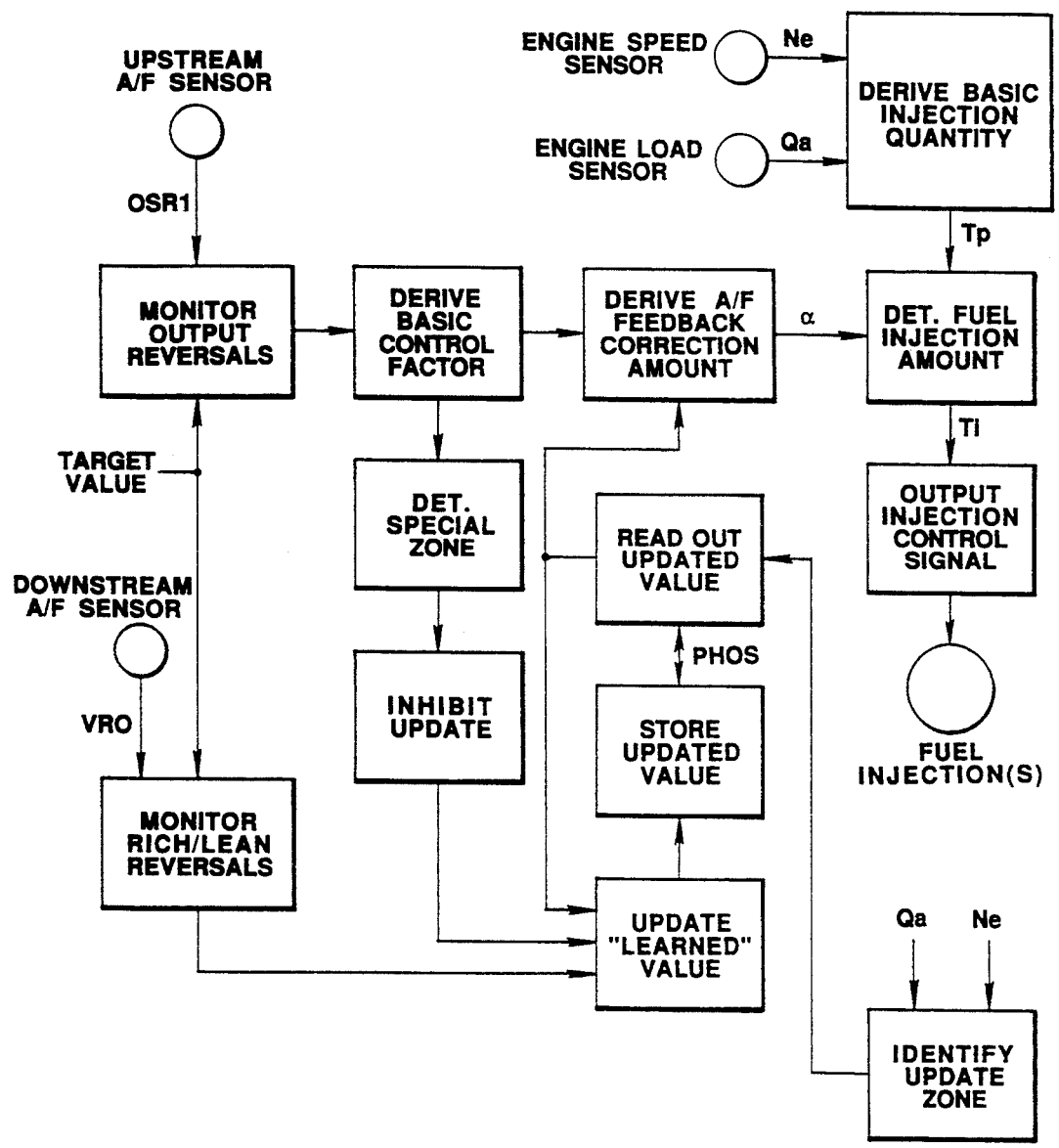
FIGS. 1 and 2 schematic block diagrams illustrating conceptual arrangements which characterize basic embodiments of the present invention.
Figure 2:
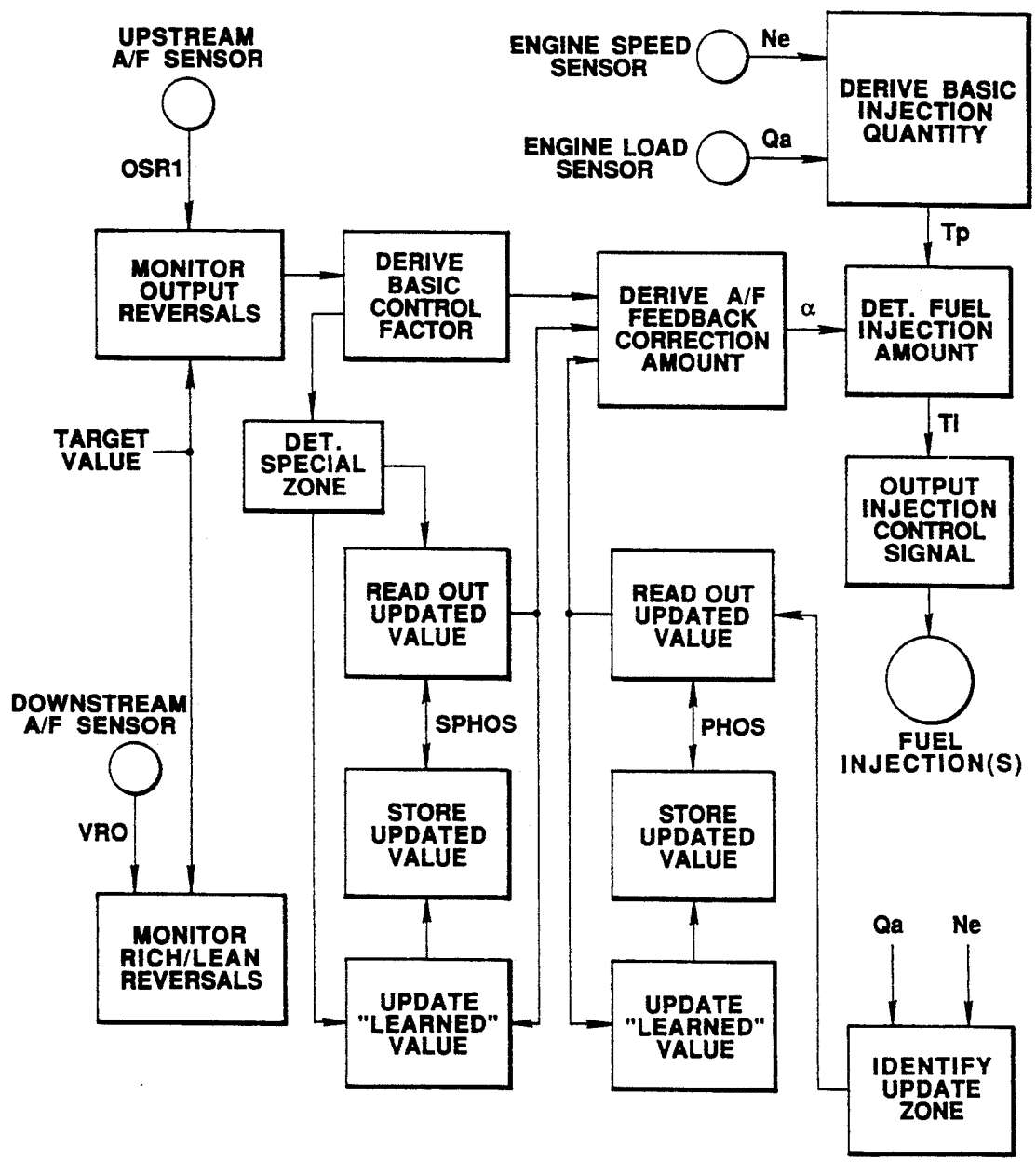
Figure 3:
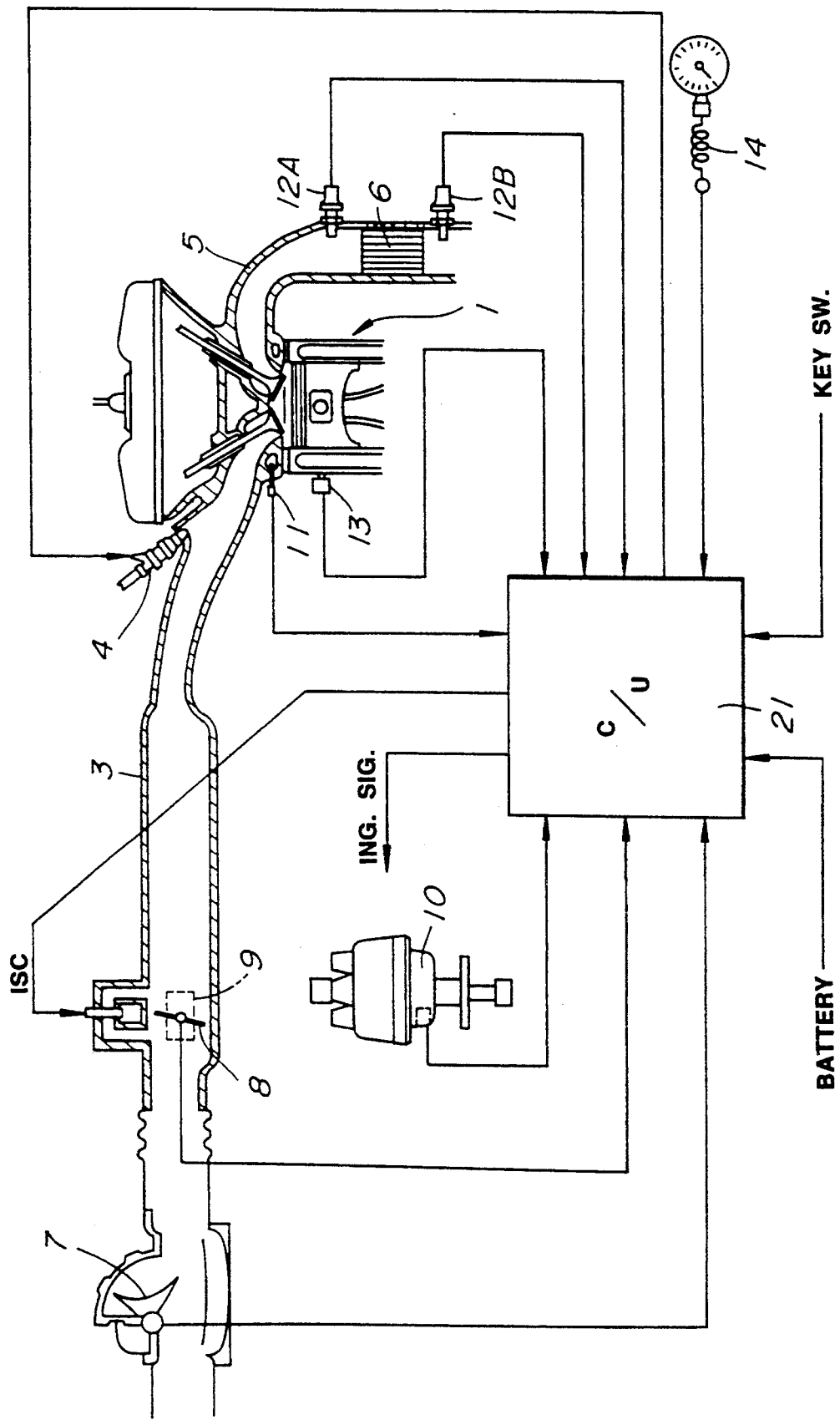
FIG. 3 is a schematic view of an engine system of the nature to which the embodiments of the present invention are applied.

FIG. 3 shows an engine system to which the embodiments of the invention which utilize completely separate O2 sensors, are applicable. Briefly, this system includes an engine 1, which is supplied air via an air cleaner (not shown) and an induction conduit 3. A fuel injector 4 is disposed in the induction conduit in a manner to inject fuel into the air flowing through the conduit 3 toward the engine 1.

The induction conduit 3 further includes an ISC vacuum limiting valve and by-pass passage arrangement. As shown in this figure, the bypass passage is arranged to communicate with the throttle chamber in a manner which by-passes the throttle valve 8.

An exhaust conduit 5 includes a 3-way catalytic converter 6.

A control unit 21 receives data inputs from an air flow meter 7 which is disposed in an upstream section of the induction conduit 3, a throttle valve position sensor 9; an engine speed/crank angle sensor 10, a coolant temperature sensor 11, a knock sensor 13, a vehicle speed sensor 14, and upstream and downstream O2 sensors 12A, 12B.

As the manner in which the above listed elements and their possible equivalents cooperate with one another is very well known and not directly related to the point of the invention, discussion of the same will be omitted for the sake of brevity.

In the illustrated arrangement the O2 sensors are of the type wherein the output tends to be binary and changes abruptly in response to very small deviations in the A/F from the stoichiometric ratio. It should be noted however, that the present invention is not limited to the same and that sensors of the "over-range" or lean type can be used in lieu thereof.

Figure 4:
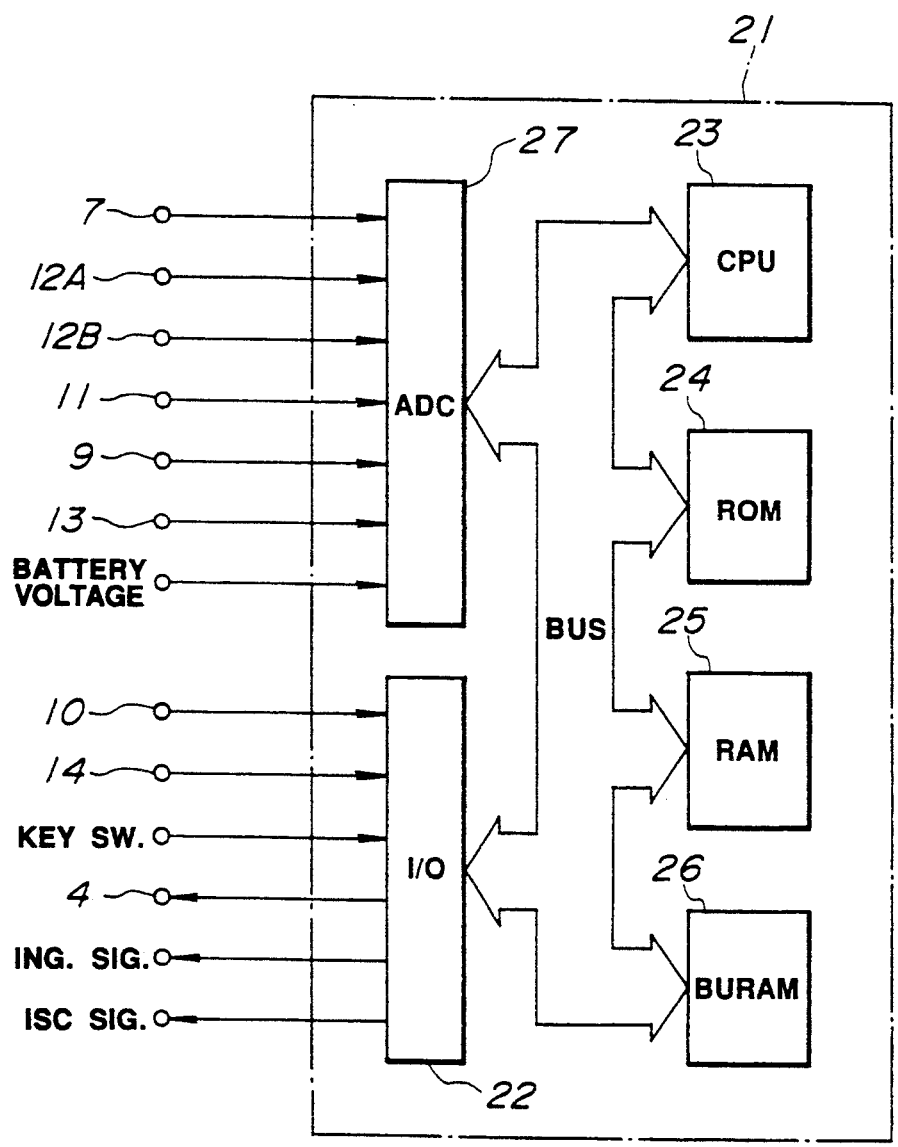
FIG. 4 is a schematic diagram showing a microprocessor arrangement which forms a part of the control unit shown in FIG. 3.

FIG. 4 is a block diagram which schematically depicts a microprocessor arrangement which is included in the control unit 21. The arrangement includes an I/O interface 22, a CPU 23, a ROM 24, a RAM 25, a back-up ram BURAM 26 and an analog-digital converter 27, which are operatively connected in the schematically illustrated manner.

Programs which provide air-fuel ratio control which includes an adaptive or self-updating function, and data therefor, are suitably stored in the memories (ROM, RAM and/or BURAM) of this device.

Figure 5:
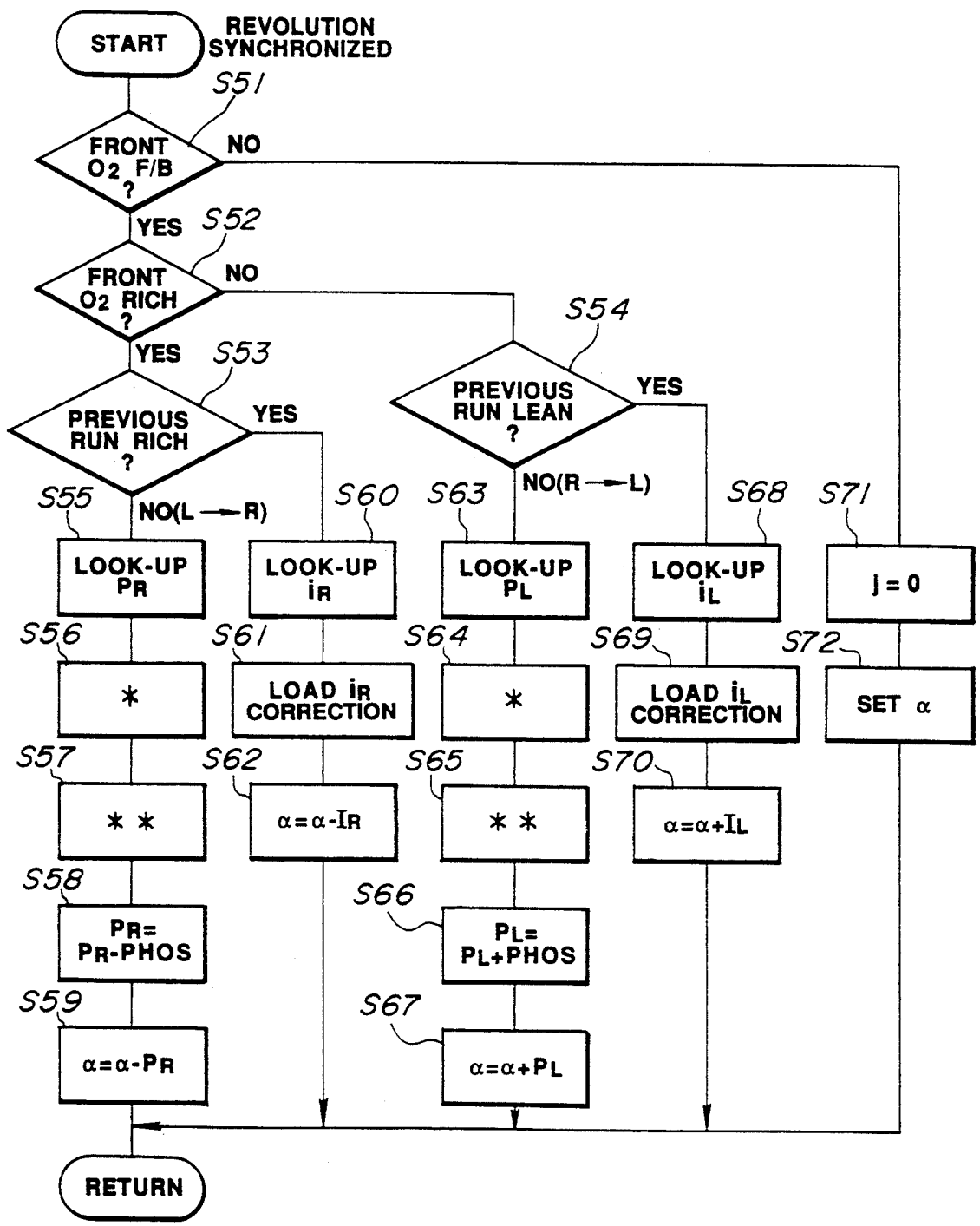
FIGS. 5 to 10 are flow charts which depict the operations which characterizes a first embodiment of the present invention.

FIG. 5 shows in flow chart form the steps which are executed by a basic air-fuel ratio control feedback routine. Steps S52–S54 of this routine are such as to monitor the output reversals of the upstream or front O2 sensor. This process involves comparing the output of the front sensor 12A with a slice level indicative of a stoichiometric air-fuel ratio in manner which determines if the sensed air-fuel mixture is either rich or lean.

Figure 11:
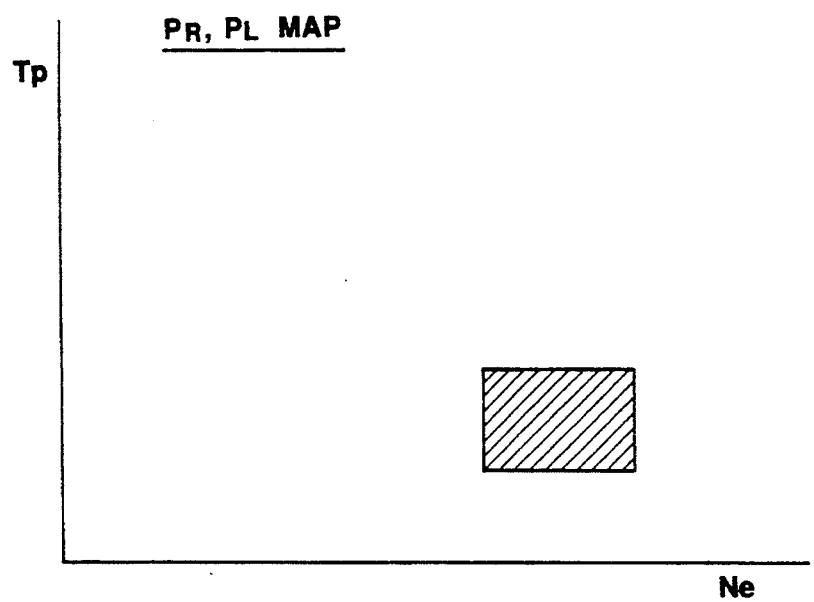
FIG. 11 depicts mapped data which is recorded in terms of engine speed Ne and basic injection pulse width (engine load), and which is used in connection with obtaining proportional components PR, PL utilized in connection with the first embodiment.

At steps S55 and S63 the result of the above mentioned comparison is used to read out a proportional component values PR, PL from mapped data. These PR and PL values are subsequently stored in a CPU register. The mapped data used in this operation is depicted in FIG. 11. In this figure the cross-hatched area denotes the "special" zone in which the data, via which engine surging is suppressed, is recorded. The data which is recorded in this zone has a finer graduation or resolution than that of the other zones.

In this instance is arranged to fall in an essentially high speed low load region of engine operation. However, it should be noted that the present invention is not limited to locating the special zone in the above mentioned region and various other regions may be selected depending on the vehicle and the mode in which the vehicle is designed to be used. Further, the present invention is also not limited to the use of finely graduated data in the special zone and a coarser graduation may be used if so desired.

Further, while the illustrated map is shown as being recorded in terms of engine load (basic fuel injection pulse width Tp) and engine speed Ne, it is possible to additionally an engine speed variation parameter.

Under normal circumstances, 8 bit processors use words which consist of 2 bytes (viz., $2 \times 8 = 16$ bits). However, not all of the bits are used for data purposes and some are devoted to designating parity (for parity check purposes) and the like. In this instant arrangement, one of the first and last bits of each word are left as zero "0" and allotted for use in the control which is implemented by the present invention. By way of example, when engine speed/load coordinates fall in an adaptive updating zone (viz., a zone such as that which surrounds the hatched area shown in FIG. 11) the control bit 7 as it will be referred to hereinafter is set to "0". On the other hand when the engine speed/load coordinates fall in the hatched area or so called special zone, the seven bit is set to "1".

At steps S60 and S68 the outcome of the front $O_2$ sensor output comparison is used to obtain integrated components iR and iL from suitable mapped data. This data is then stored in a CPU register ready for further use. At steps S61 and S69 the following equations are used with the iR and iL values and the previously mentioned Ti value to derive final integrated values IR and IL.

$$IR = iR \times Ti \quad (1)$$

$$IL = iL \times Ti \quad (2)$$

It should be noted that the present invention is not limited to the use of Ti and that it is possible to use Tp+OFST wherein OFST is a given offset amount. However, in this instance the engine load requires correction. In the event that the driving zone is such as to prolong the control period of $\alpha$, the amplitude of $\alpha$ increases and the purification effect of the three-way catalytic converter tends to reduce. For this reason the amplitude of $\alpha$ is held constant irrespective of the $\alpha$ control period.

At steps S58 and S66, the following equations are used to adjust the instant proportional component values PR, PL using an updating value PHOS.

$$PR = PR - PHOS \quad (3)$$

$$PL = PL + PHOS \quad (4)$$

Using these equations it is possible, in the event that the output of the upstream $O_2$ sensor is off target in either direction, to update using the PHOS value in a manner which obviates the error and brings the output back to the desired level.

Figure 6:
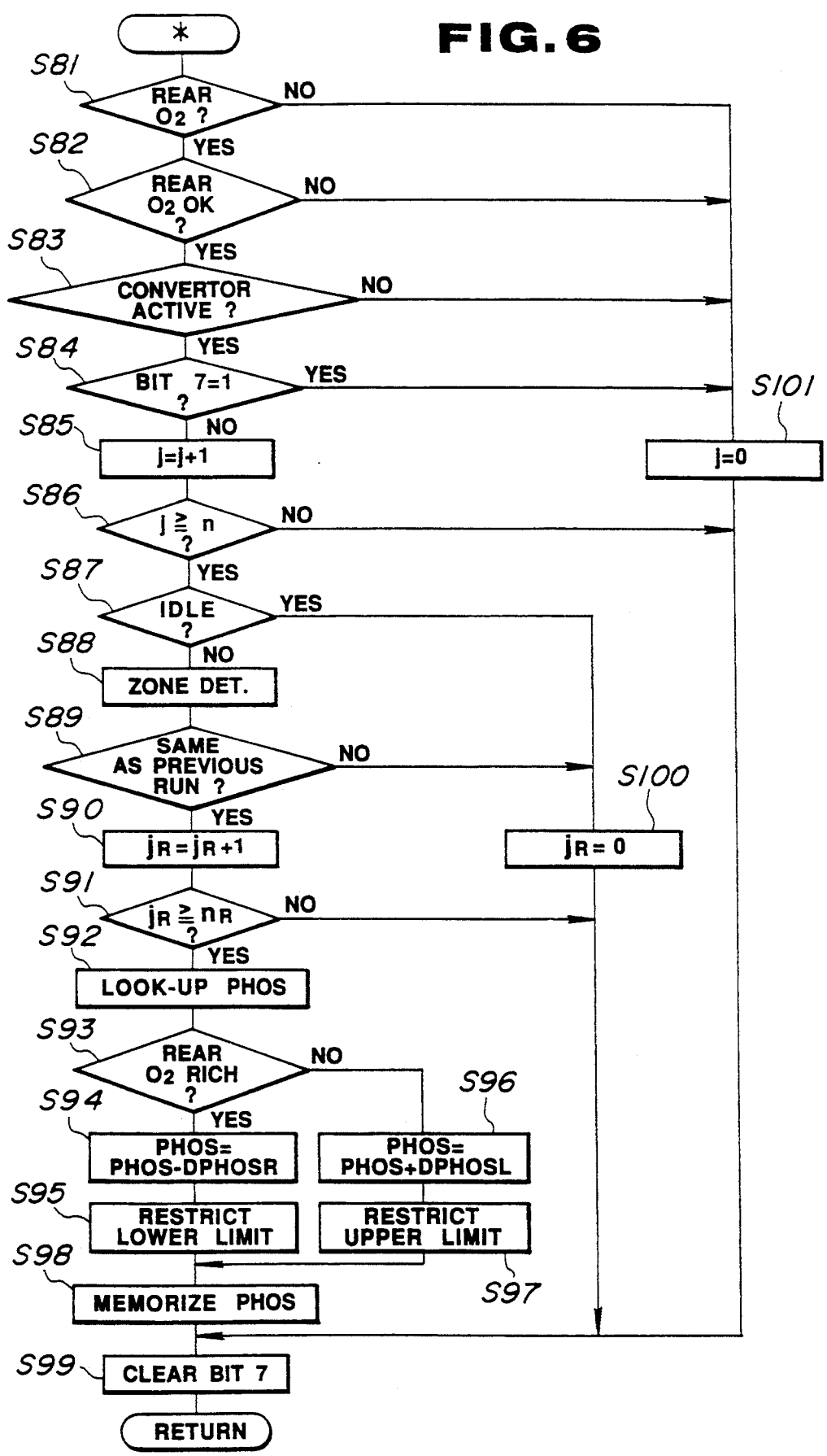
Figure 7:
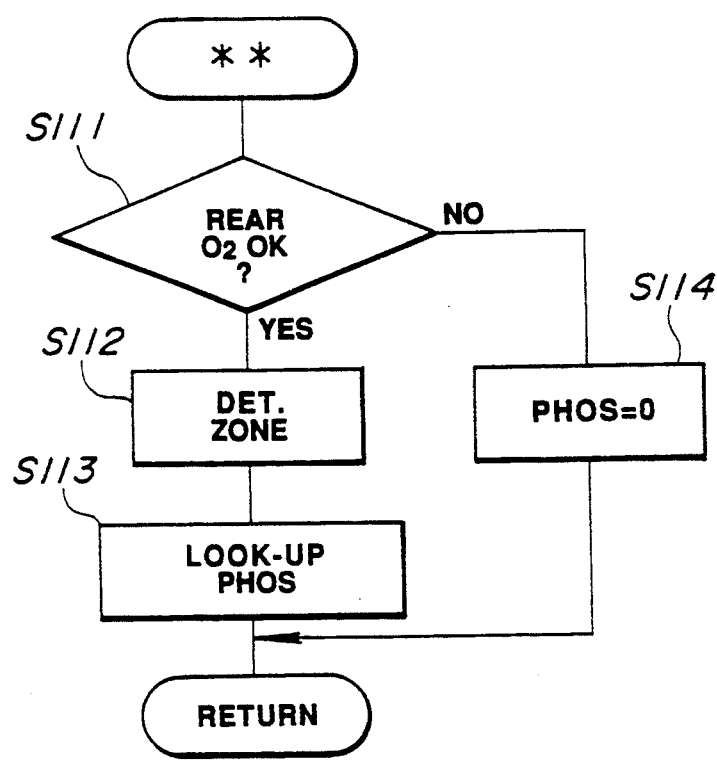

At steps S56 and S64 the routine which is depicted in FIG. 6 is run while in steps S57 and S65 the routine which is shown in FIG. 7 is run. The routine shown in FIG. 6 is arranged to determine the period with which the output of the front or upstream $O_2$ sensor reverses its output.

Steps S81 to S87 of this routine are such as to determine if conditions which permit adaptive update exist or not. That is to say, at step S81 the instant status of the downstream or rear $O_2$ sensor 12B is checked to determine if it is active or not. At step S82 the output characteristics of said sensor are examined in order to determine if a malfunction has occurred or not. In the event that there is nothing wrong the routine goes on to step S83 wherein it is determined if the catalytic converter 6 is active nor not.

In the event that the $O_2$ Sensor 12B is active, is not malfunctioning and the catalytic converter 6 is active, then at step S84 the status of the bit 7 is examined. If it is found that bit 7 has not been set to "1" (indicating that the engine speed and load coordinates do not fall in the special zone) then the routine goes to step S85. At this step a counter j is incremented by 1. This counter is such as to indicate the number of times the output of the $O_2$ sensor 12A has reversed level. At step S86 the status of the counter j is checked. When the count has exceeded a predetermined number n (wherein n=12 for example) it is deemed that an adaptive updating can be be safely carried out and the routine proceeds to step S87 wherein it is determined if the engine load is minimal the engine is idling. If the engine is idling then air-fuel feedback control is stopped. On the other hand, if the outcome of this enquiry is negative, indicating a positive load on the engine, then the routine flows to step S88 wherein the instant operational zone is determined.

Figure 12:
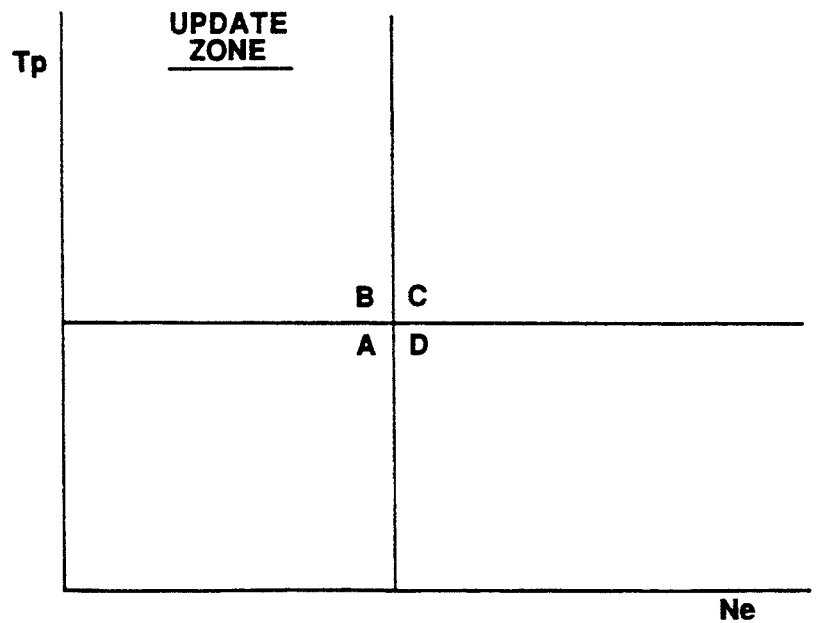
FIG. 12 depicts mapped data which is recorded in terms of engine speed and engine load and which shows the zone in which adaptive updating is carried out in accordance with the present invention.

FIG. 12 depicts mapped data which is recorded in terms of engine speed and engine load and which is divided into four sub-zones A–D. Each of these sub-zones contain prerecorded adaptive update PHOS values. As will be appreciated all of the four sub-zones are used for adaptive data and thus the frequency or number of chances with which adaptive update can be carried out is maximized. This also permits the resolution of the adaptive data to be reduced.

As step S89 it is determined if the sub-zone in which the engine speed and load coordinates fall is the same as on the last run of the instant routine. If the outcome is affirmative then at step S90 a counter jr is incremented and at step S91 the status of this counter checked. In the event that counter jr has exceeded a predetermined number nR (e.g. nR=6) indicating that the speed/load coordinates have fallen in the same zone for the last 6 runs of the instant routine then it is deemed that the response delay of the rear or downstream $O_2$ sensor 12B has been allowed for.

At step S92 during a predetermined period of time the adaptive updating value PHOS is read out of mapped data which is recorded in memory and the value set in a register in the CPU. Following this, at step S93 the output of the rear $O_2$ sensor 12B is compared with a slice level indicative of a stoichiometric air-fuel ratio and it is determined if it indicative of a rich mixture or not. In the case of a rich detection then the routine flow to step S94 while in the case of a lean indication, the routine is directed to step S96.

At steps S94 the PHOS value which was looked-up in step S92 is modified in accordance with the following equation $$PHOS = PHOS - DPHOSR \quad (5)$$

Viz., PHOS is decremented by a predetermined value DPHOSR. The reason for this is that the rich mixture detection requires that the air-fuel ratio be shifted back toward the lean side. To this end at step S59 the value of PR is increased while at step S67 the value of PL is reduced. In order to achieve this it is appropriate that the value of PHOS be reduced as will be appreciated from equations (3) and (4).

On the other hand, if the outcome of step S93 is such as to indicate that the air-fuel mixture was rich, then it is necessary to shift it back in the lean direction. Therefore at step S69 PHOS is updated according to the following equation:

$$PHOS=PHOS+DPHOSL \qquad (6)$$

wherein DPHOSL is a fixed value.

As different from the above decrement process using DPHOSR the instant incrementing increases PL and decreases PR and thus has a desirable effect on emission levels.

Steps S95 and S97 are such as to limit the degree to which restrict the degree to which the PHOS value can be increased and decreased within suitable control limits and thus prevent abnormal values from developing which would tend to destabilize the air-fuel ratio control.

At step S98 the revised version of PHOS is written back into memory at the address from which the value was read out in step S92.

On the other hand, as step S84, in the event that bit 7 has been set to "1" indicating that the vehicle is operating in such a manner that the engine speed and load coordinates fall in the special zone, the routine is induced to flow across to step S100 wherein counter j is reset and and go directly to step S99 by-passing the updating process.

In step S99 the values of PL and PR which are set in CPU registers are changed so that bit 7 is rest to "0".

FIG. 7 shows a routine which is used to perform the PHOS look-up. This routine is run in response to the front O2 sensor 12A output VFO undergoing a change. Step 111 of this routine is such as to check the status of the rear O2 sensor 12B. In the event that the sensor is not malfunctioning and is operating in a manner which enables air-fuel ratio control to be based on its output (VRO) then the routine goes to step S112 wherein the instant engine speed/load zone in which the vehicle is operating, is determined. At step S113 the appropriate value of PHOS is read out of memory and used in steps S58 and S66 described above in connection with the routine shown in FIG. 5.

However, in the case the rear O2 sensor is found to be operating improperly, the routine goes across to step S114 wherein PHOS is arbitrarily set to zero to avoid totally erroneous revision and resulting airfuel control.

Figure 8:
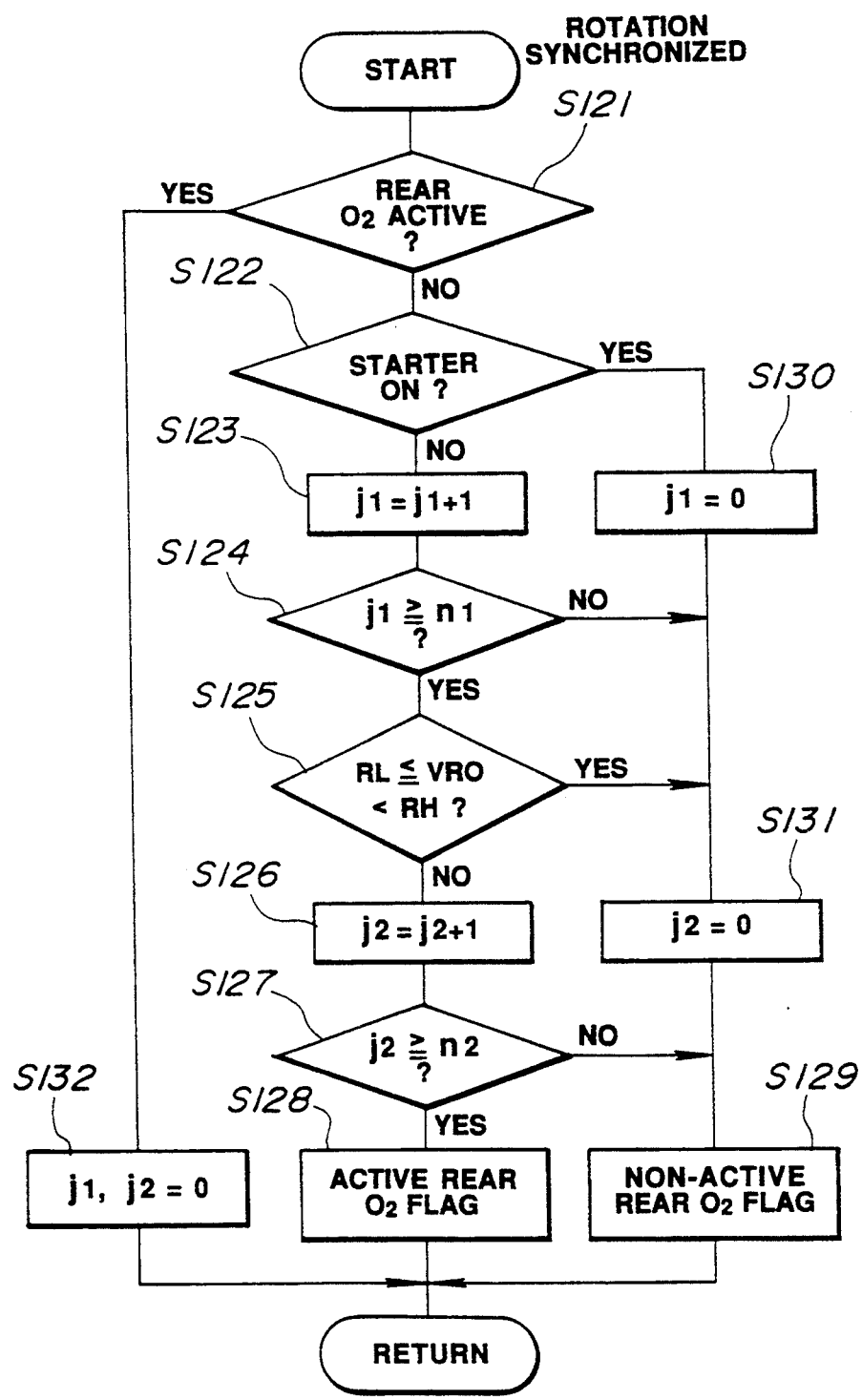

FIG. 8 shows a routine which is used to determine if the rear O2 sensor is active or not. This routine is run at step S81 of the routine depicted in FIG. 6. Accordingly, as the routine is run in synchronism with engine rotation, the sub-routine shown in FIG. 8 also is run with the same timing.

The first step S121 of the instant routine is such as to check the setting of a flag which is set in response to the sensor being determined as being active. In the event that this flag has not be set the routine goes to step S122 wherein it is determined if the engine is being cranked or not. This is determined by sampling the output of the starter switch. If the switch is found to be ON then the routing goes across to steps S130 and S131 wherein counters j1 and j2 are cleared.

On the other hand, if the starter switch is found to be OFF then the routine goes to step S123 wherein counter j1 is incremented. This counter is such as to determine the number of engine rotations which have occurred since engine cranking was terminated. Following this, at step S124 it is determined if a predetermined number of engine revolutions n1 have been completed or not. Until this number is exceeded the routine is directed to steps S131 and S129.

Figure 13:
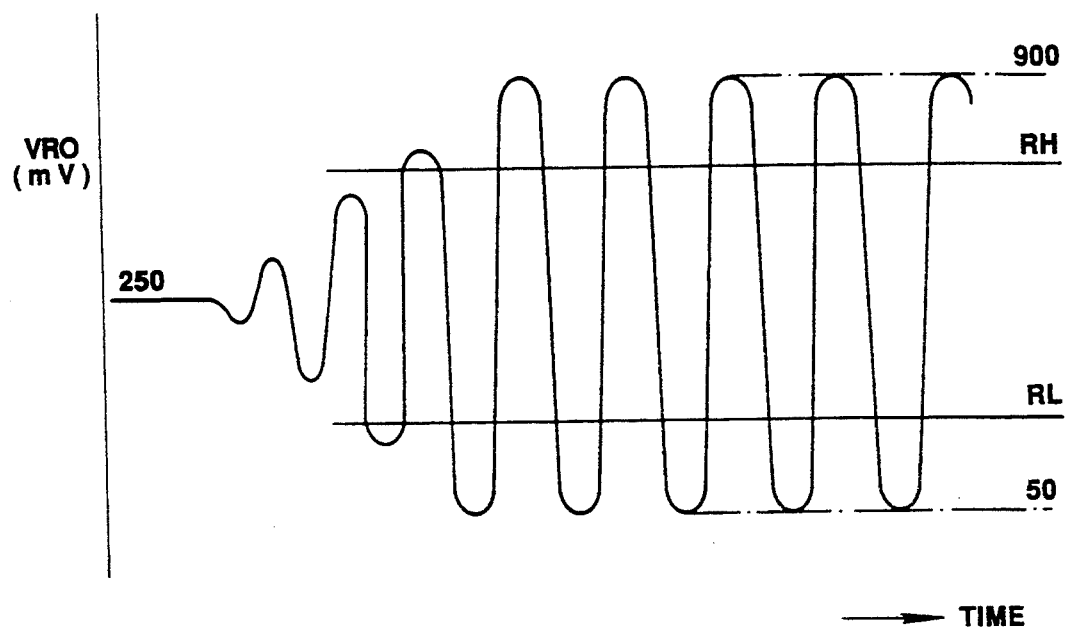
FIG. 13 graphically depicts the output characteristics produced by the downstream or rear O2 sensor.

Upon the predetermined number of engine revolutions being exceeded the routine is directed to step 5125 wherein it is determined if the output VRO of the rear O2 sensor 12B falls in a range defined between upper and lower limits RH and RL (e.g. falls in a range defined between 700 mV and 200 mV). As shown in FIG. 13 the output of the O2 sensor 12B can be expected to vary between a maximum of approximately 900 mV and a minimum of about 50 mV. Accordingly, if RL $\leq VRO<RH$ then it can be deemed that the sensor is active. Nevertheless, at step S126 a counter j2 is incremented. Until this counter reaches a given value, in this case n2, the active flag setting which takes place in step S128 is prevented. The count n2 is determined based on the characteristics of the type of engine to which the system is applied.

Figure 9:
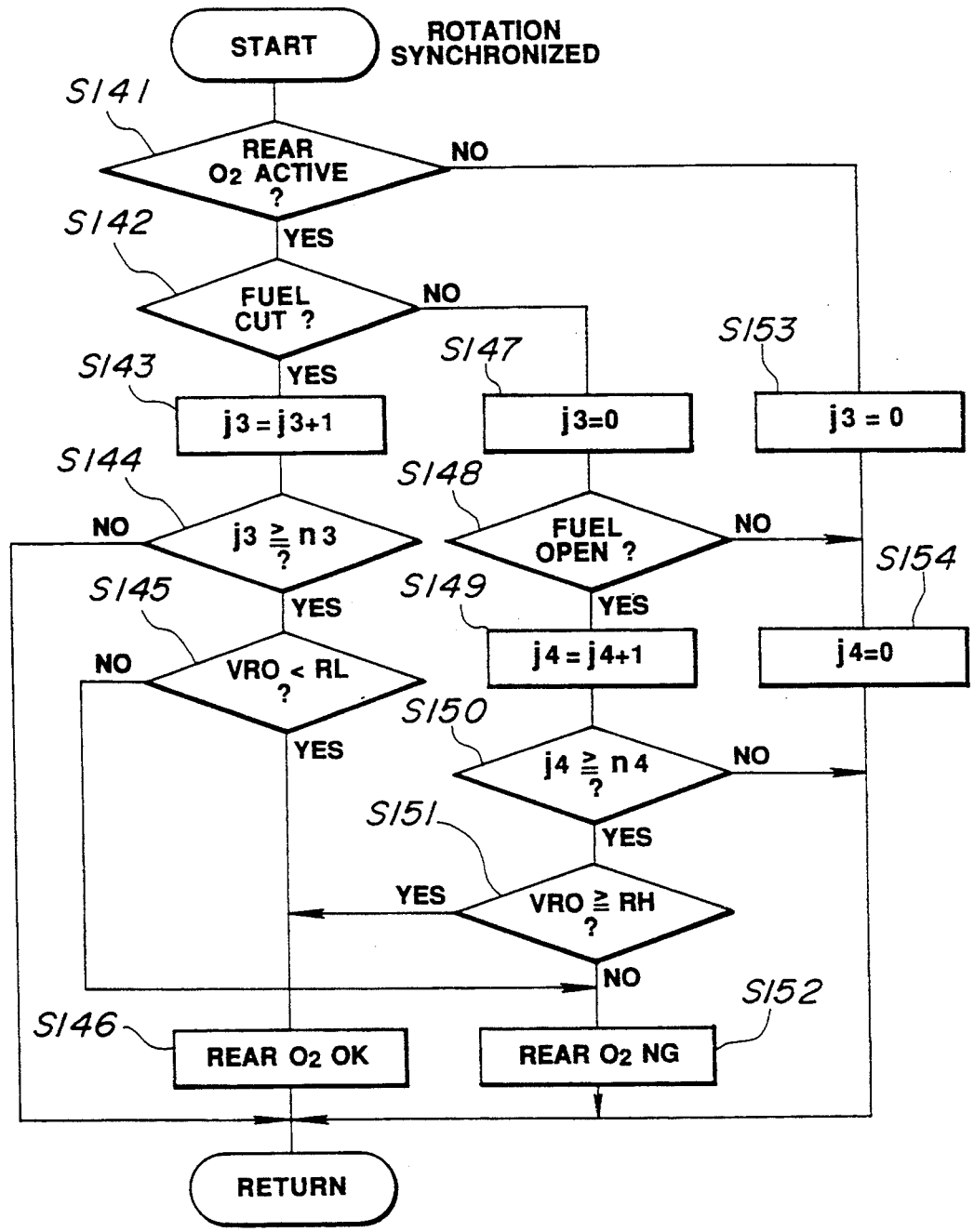

FIG. 9 depicts a diagnostic routine which is used to determine if the rear O2 sensor is malfunctioning or not. This routine determines if the level of VRO falls below the above mentioned lower limit RL a predetermined time after the engine is subject to a fuel cut, or if VRO rises above the upper limit RH in response to full throttle operation being maintained for more than a predetermined period. It will be appreciated from the flow chart that timer j3 is such as to time the period from a fuel cut, and timer j4 is such as to time the period for which full throttle engine operation takes place and that n3 and n4 are set depending on the type of engine involved.

Depending on the outcome of the timings and comparisons, a flag is set to denote that the rear O2 sensor 12B is OK or NG (no good) at steps S146 and S152.

Figure 10:
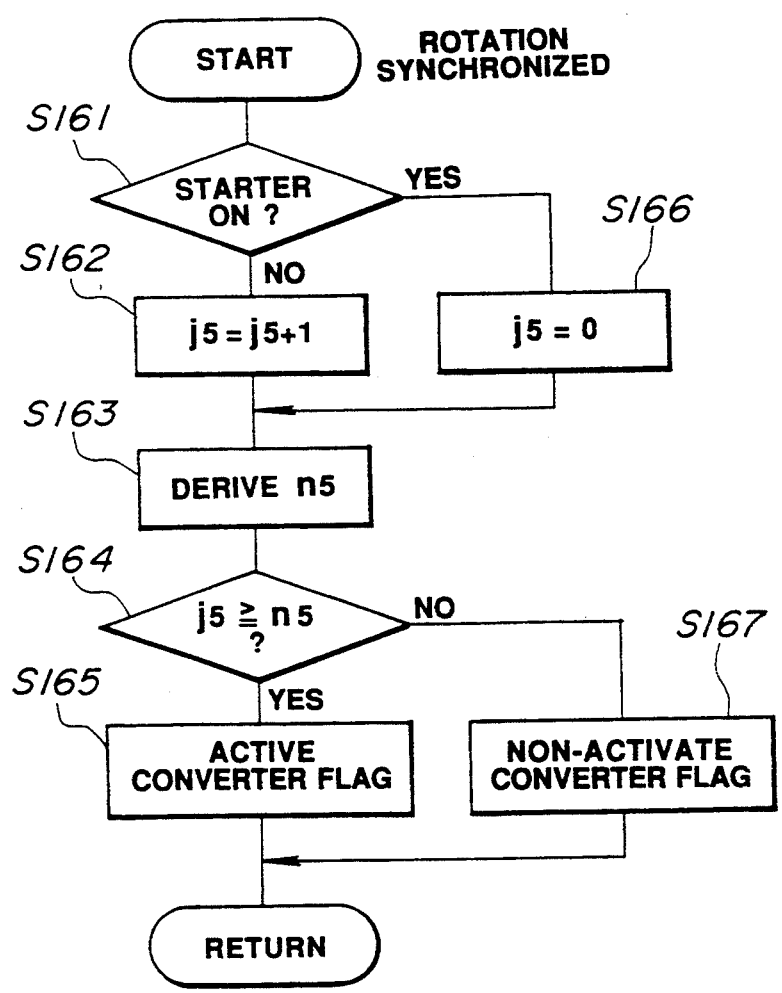

FIG. 10 depicts a routine which is used to determine if the catalytic converter is active or not. The steps of this routine are such that the counter j5 counts from the time engine cranking terminates (starter switch changes from ON to OFF). Upon reaching a value of N5 a converter active flag is set. In this instance the value of is determined based on engine coolant temperature at the time of engine start-up (see FIG. 14).

It will be noted that the routine shown in FIG. 9 is run at step S82 of the routine shown in FIG. 6, and in step S111 of the routine shown in FIG. 7. On the other hand, the routine shown in FIG. 10 is run as step S83 of the routine shown in FIG. 6.

In operation the above described arrangement is such that in order to increase the frequency of adaptive updating, as shown in FIG. 12 the area of the updating zone is maximized. On the other hand, as the original object is feedback control of the air-fuel ratio for emission reduction purposes, as shown in FIG. 11, in order to improve engine driving characteristics during the predetermined engine speed/load driving zone wherein surging tends to occur, fine resolution data is recorded.

Figure 15:
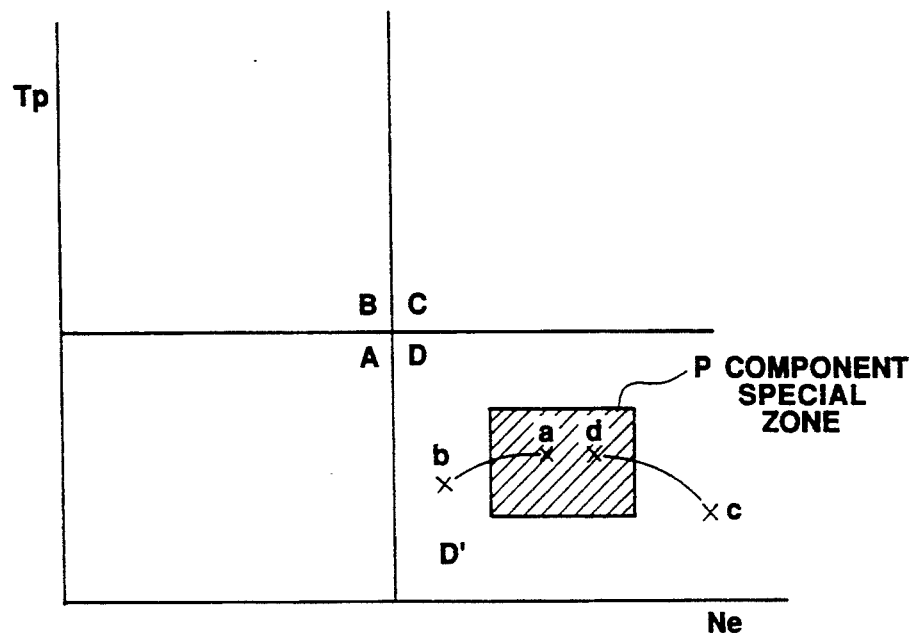
FIGS. 15 and 16 depict mapped data in which is recorded in terms of engine speed and engine load and which is used in connection with the first embodiment.

The effect of this is demonstrated in FIG. 15 wherein the special zone id illustrated as being located in the adaptive update zone D in a manner to be surrounded by a zone designated D'.

Assume that an update value which is stored at an address designated by point a located in the special zone is updated and the driving conditions shift from point a to point b. Until the updating value for point b is revised, the value which was obtained in the special zone and updated is used and thus brings about the situation wherein sudden change in the fuel supply amount occurs and deteriorates the emission control.

To overcome this problem the instant embodiment is such to use the unused bit (bit 7) as to indicate if the instant engine operation falls in the special zone or not. Thus, even though the special zone is located in the middle of an updating map region, the above mentioned problem is overcome.

Therefore, by using this type of indication it is possible to temporarily stop the adaptive updating process. This prevents the updating process from being carried out while the operating conditions fall at point a in the special zone and in the event that the engine speed/load coordinates shift to point b in the updating zone D', as no updating took place at point a, then directly following a shift to point b an update value can be read out and therefore obviate the deterioration in the emission control.

According to the present invention, even if the special zone is defined within basic control map data, no ill effect on the air-fuel ratio control is experienced, the updating frequency is not reduced and same memory area can be used.

Figure 17:
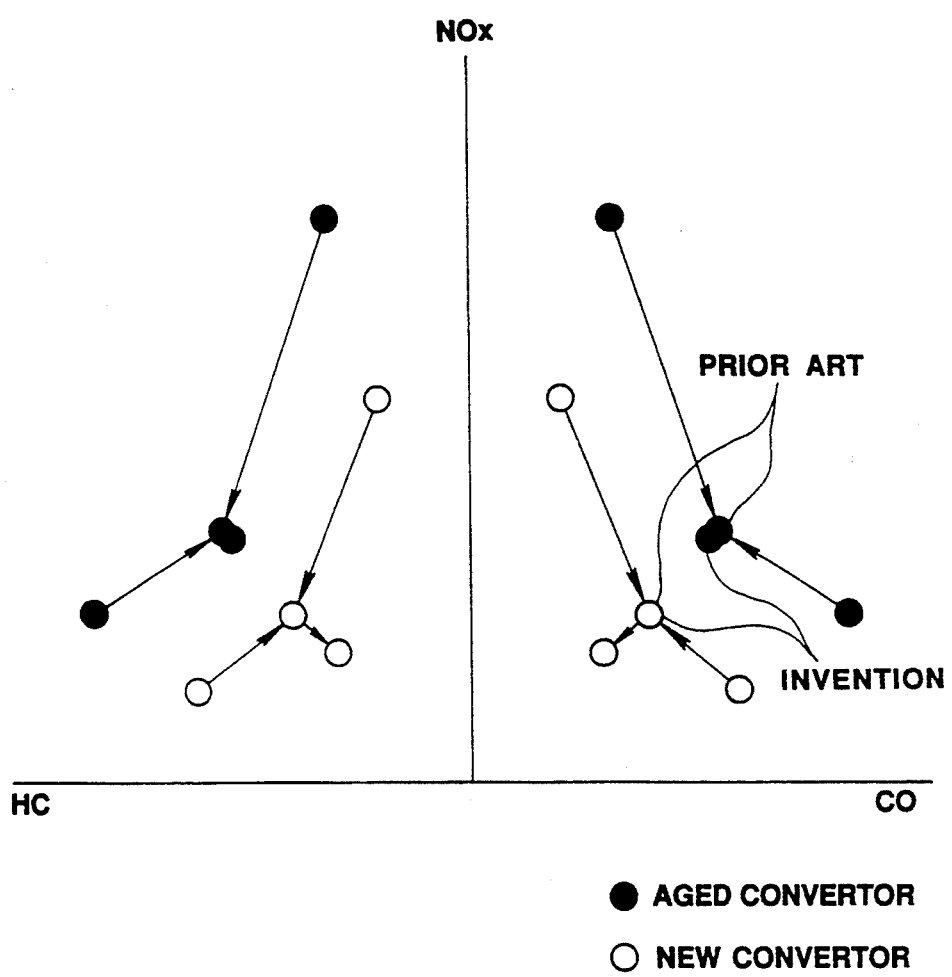
FIG. 17 is a graph comparing the exhaust emission control achieved with the present invention with that achieved with the prior art.

In FIG. 17 a comparison of the exhaust emission characteristics obtained with the the present invention and the prior art discussed in the opening paragraphs of the instant disclosure, is set forth graphically. In this figure the white circles denote the characteristics obtained when the converter is new while the black dots represent the characteristics which are produced when the converter is well used or aged.

Figure 16:
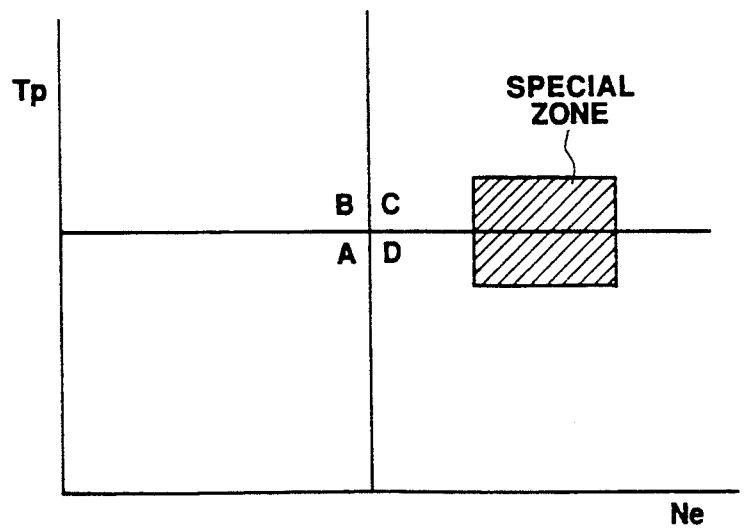

It should be noted that the invention is not limited to locating the special zone within one particular updating zone as shown in FIG. 15 and can be arranged to overlap two or more zones in the manner illustrated in FIG. 16 while producing the same effect.

SECOND EMBODIMENT

Figure 18:
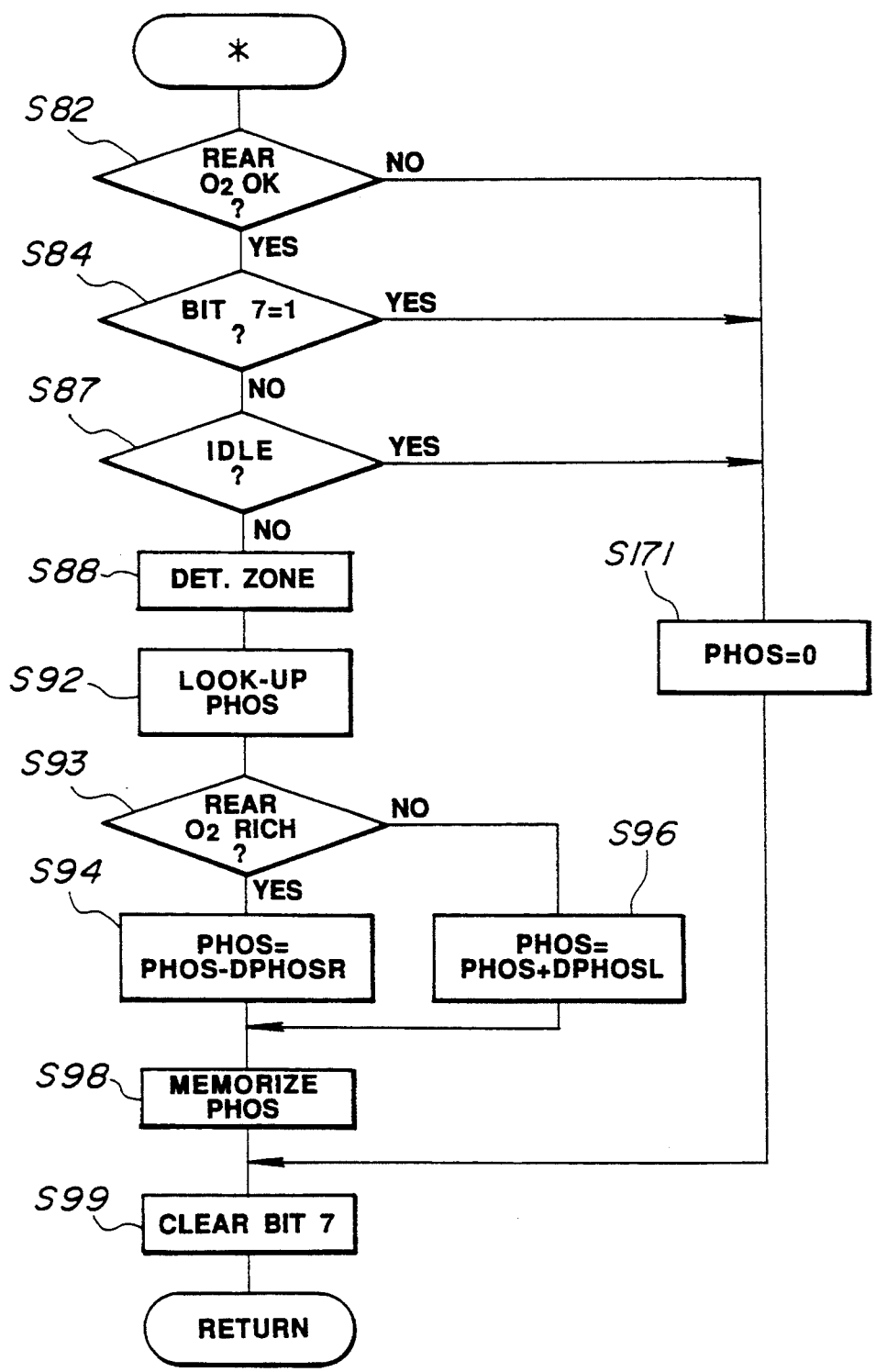
FIG. 18 is a flow chart which depicts the steps which are executed in accordance with a second embodiment of the present invention.

FIG. 18 shows a sub-routine which characterizes a second embodiment of the present invention. This routine differs from the one shown in FIG. 6 basically in that at step S171, PHOS is set to zero in the event that step S84 indicates that bit 7=1 indicating that the engine is operating in the special zone. As the update value which was developed in the D' zone is not suited to the surge suppressing function of the special zone, rather than use d value which will not produce optimal effect, the instant embodiment resets the same to an arbitrary value (in this case zero) upon the mode of engine operation entering the special zone.

THIRD EMBODIMENT

Figure 19:
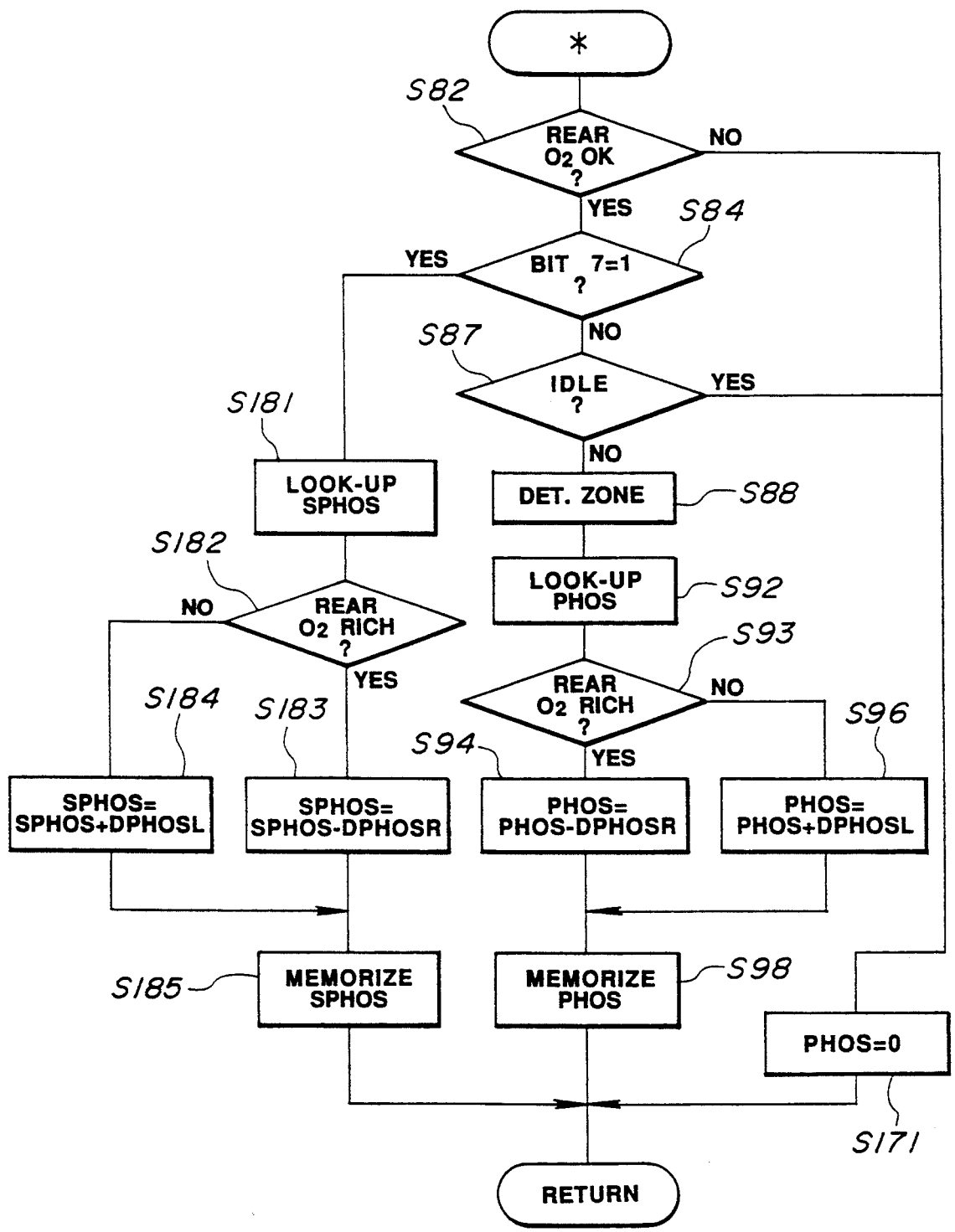
FIGS. 19 and 20 are flow charts which depict the operations which characterize a third embodiment of the invention.
Figure 20:
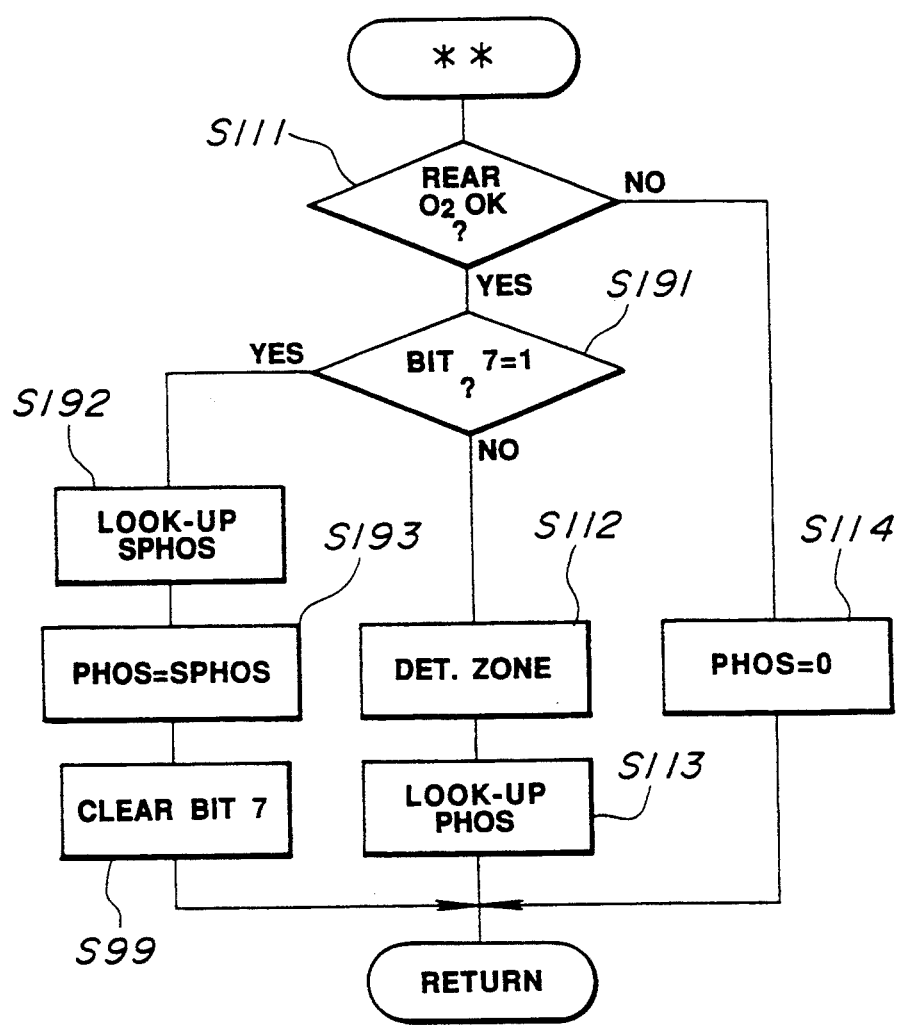
Figure 21:
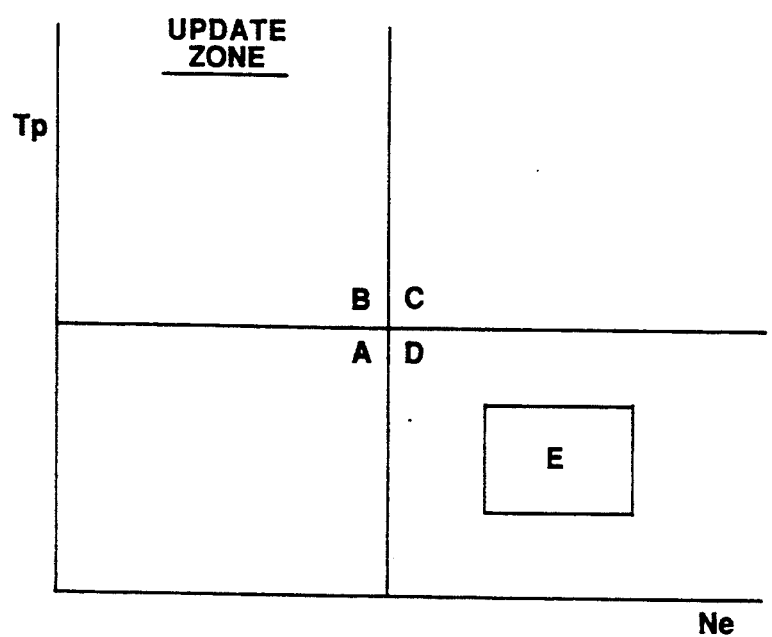
FIG. 21 depicts mapped data which is used in connection with the third embodiment.

FIGS. 19 and 20 show in flow chart form the steps which characterize a third embodiment of the invention. As will be appreciated these flow charts are basically similar to the ones shown in FIGS. 6 and 7.

In this embodiment, an additional memory space is added for the special zone E and defines an arrangement wherein the total number of memory sections is five.

As shown in FIG. 19, at step S84 the status of bit 7 is checked and in the event that it has been set to "1"indicating that the engine speed and load coordinates fall in the special zone E then the routine is directed to flow to steps S181–S185. In step S181 the additional memory in which the special zone data SPHOS is recorded, is accessed in place of the memory in which the adaptive update values PHOS are logged.

Additionally, in the event that it is determined that the engine is operating in the special zone at step S191 of the ** routine shown in FIG. 20, then the routine flows to steps S192 and S193 wherein a SPHOS value is looked up from memory section E and set in CPU register as the current PHOS value.

Figure 14:
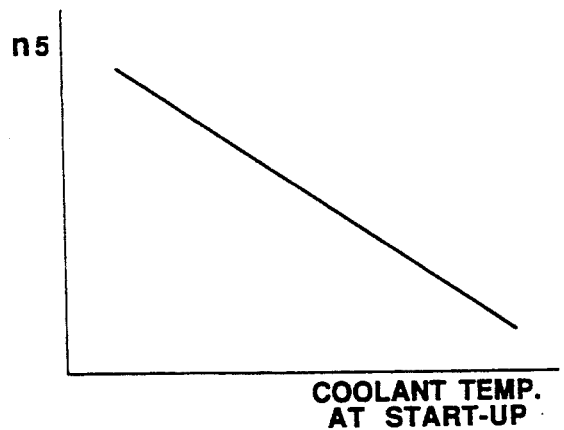
FIG. 14 is a graph which depicts the manner in which a basic value n5 varies with coolant temperature.

As shown in FIG. 14, as the updating process is interrupted while the engine operation falls in the special zone an a–b transition can take placed without problem- viz., this allows the appropriate updating value to be readout out immediately after the operation moves out of the special zone. However, a problem tends to be encountered if the reverse shift takes place. viz., as shown in FIG. 14 the engine operation changes from point c to point d, a suitable update value cannot be immediately obtained. Further, as shown in FIG. 18 as the updating function in the special zone is curtailed, and as the injectors sometimes become blocked and or the injection characteristics thereof vary with the passing of time, the surge attenuating function tends to be lost.

To overcome these latter problems the instant embodiment provides a separate dedicated memory for special zone usage. While this increases the number of memories as compared with the previous embodiment, it allows an increase in the special zone air-fuel ratio control frequency and obviates the deterioration which tends to occur with the passing of time (viz., the SPHOS value is adaptively updated in steps S183 and S184).

Figure 22:
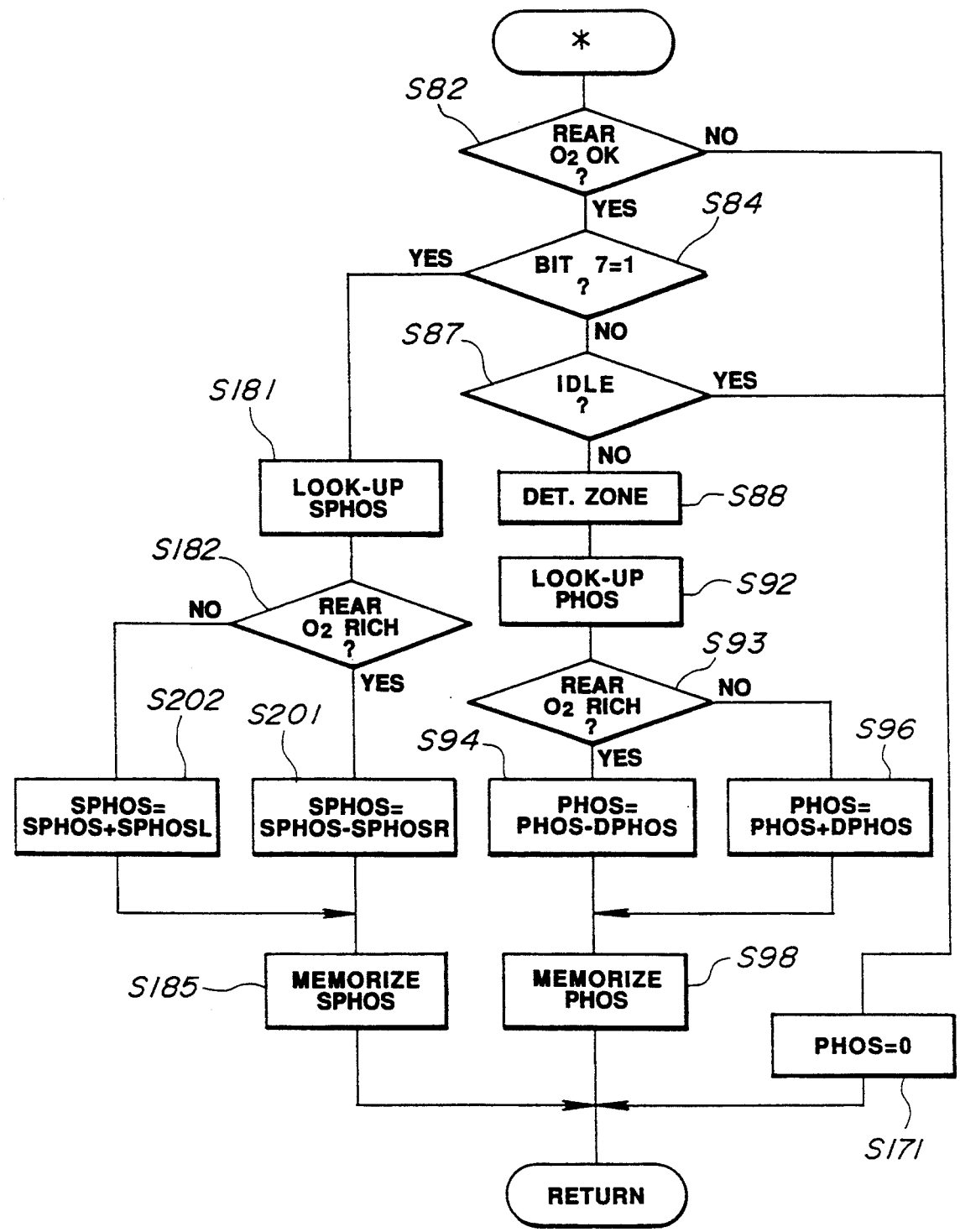
FIG. 22 is a flow chart which shows the operations which characterize a fourth embodiment of the present invention.
Figure 23:
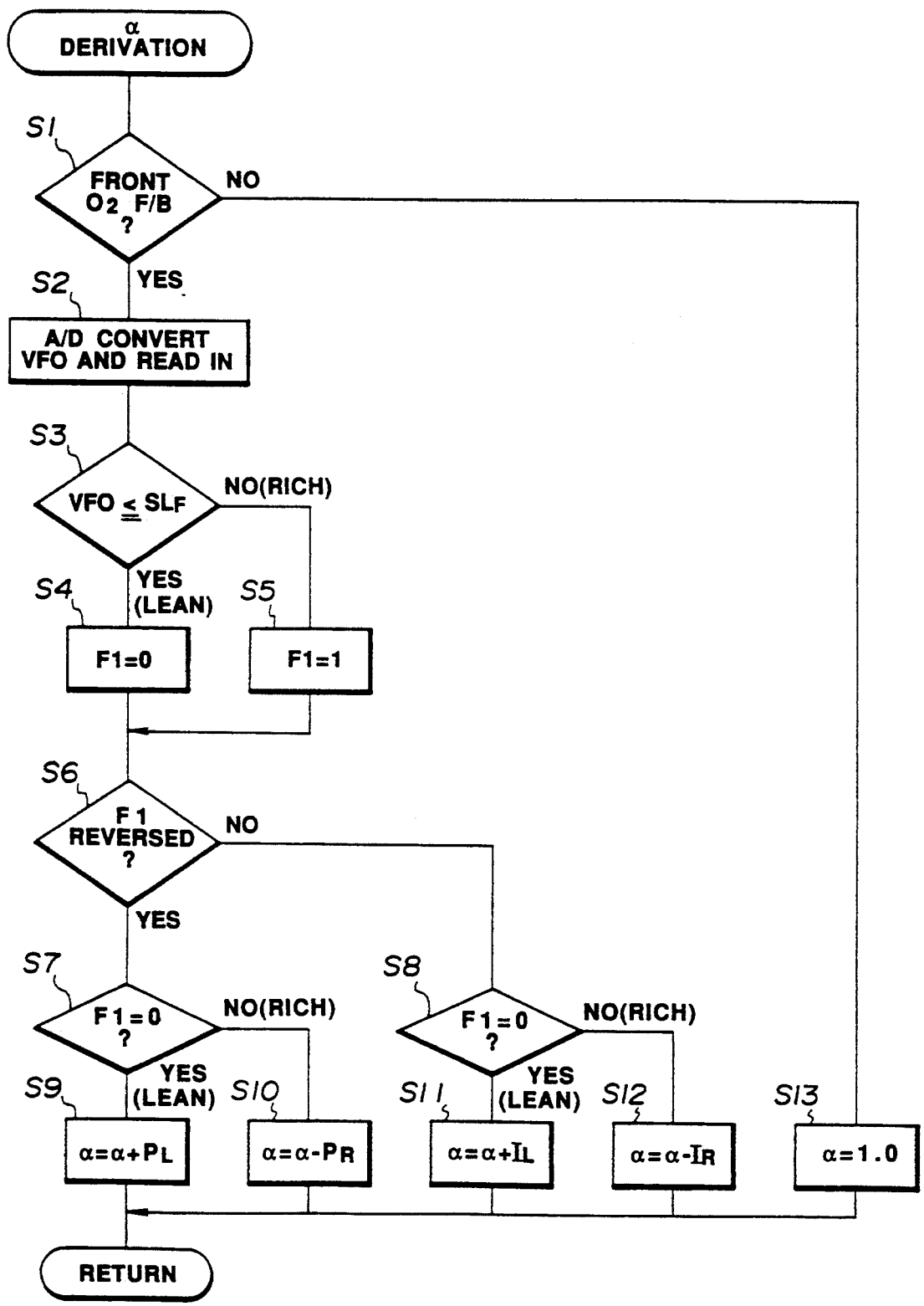
FIGS. 23-25 are flow charts which depict the routines disclosed in the opening paragraphs of the instant disclosure under the heading of "prior art".
Figure 24:
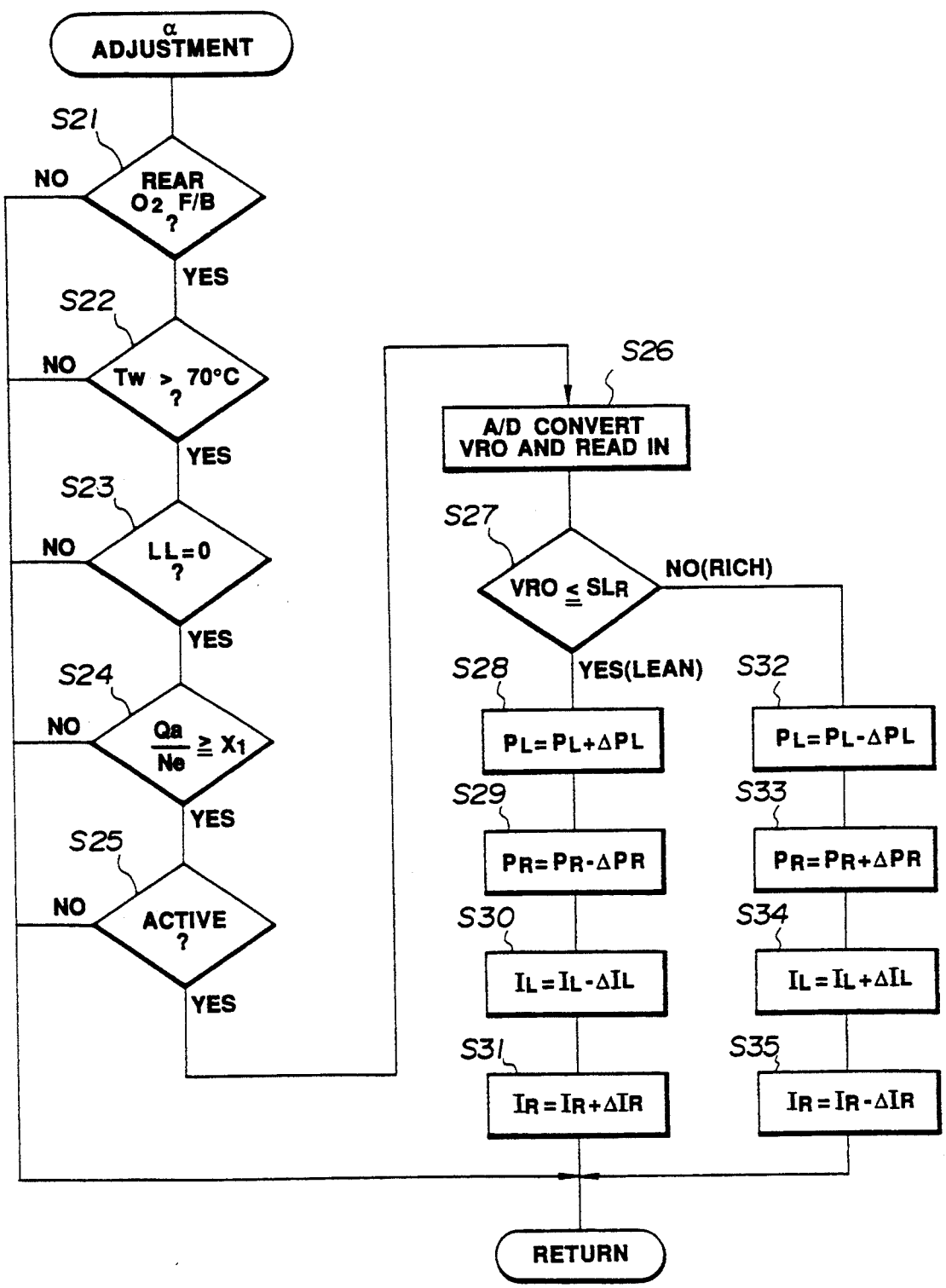
Figure 25:
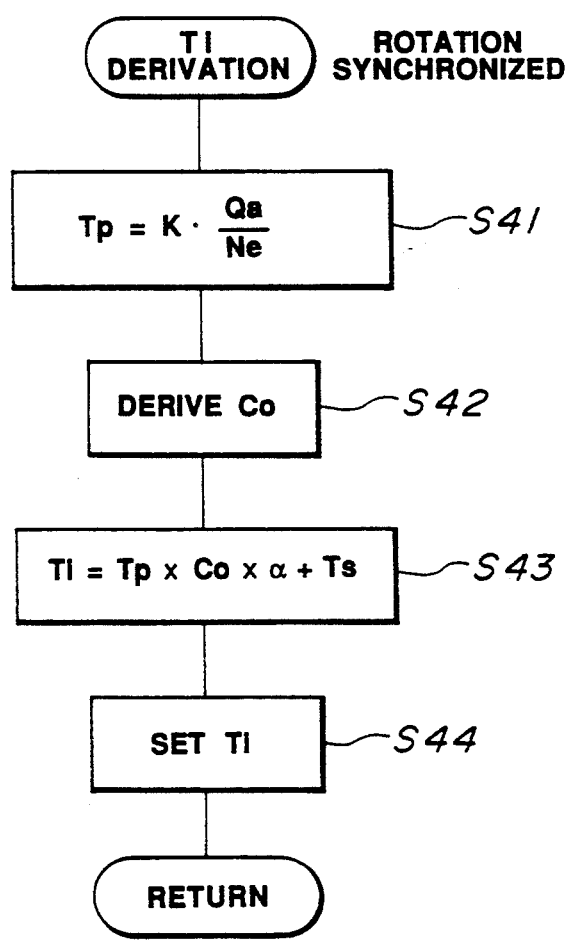

FIG. 22 shows a fourth embodiment of the present invention. This embodiment is basically similar to the one shown in FIG. 19 and differs in that in steps S201 and S202 the PHOS value is incremented and decremented by SPHOSL and SPHOSR rich values which are smaller from the DPHOSL and DPHOSR values used in steps S183 and S184. The PR and PL values stored in the special zone map are smaller (exhibit a finer resolution) than the other memory zones and thus it is appropriate that the updating speed be lower than that employed in the other regions in order to improve the accuracy of the data therein.

However, it should be noted at this point that the present invention is not limited to the use of the smaller increments and that various modifications and changes are possible without departing from the spirit of the same.

It should also be noted that the above described techniques are not limited to the PR, PL values and can be applied alternatively or in combination with the integrated values, the air-fuel ratio decision delay period, the slice level with which the outputs of the $O_2$ sensors are compared with, and the like.

What is claimed is:

1. An internal combustion engine air-fuel ratio control apparatus comprising:
   sensor means for sensing engine speed and engine load;
   a catalytic converter disposed in an exhaust gas conduit;

a first air-fuel ratio sensor disposed in the exhaust gas conduit upstream of the catalytic converter;

a second air-fuel ratio sensor disposed in the exhaust gas conduit downstream of said catalytic converter;

fuel injection means for supplying fuel into the engine;

a control circuit operatively connected with said sensor means and said fuel injector means, said control circuit including circuitry for;

using an output of said sensor means to determine a basic injection pulse width;

determining an air-fuel ratio feedback control factor value based on the output of said first air-fuel ratio sensor;

determining an actual pulse width by correcting the basic pulse width using air-fuel ratio feedback control factor;

modifying air-fuel ratio feedback control factor using an adaptive update value which is read out of memory in a first predetermined manner, based on the instant engine speed and load, and updated based on the output of said second air-fuel ratio sensor; and inhibiting the updating of said adaptive update value in the event that the output of said second means indicates that the engine is operating in a predetermined zone of engine speed and engine load, wherein said control circuit comprises an inhibiting means for inhibiting the updating of said adaptive update value in response to a special zone signal, and a storage means for storing a data table which contains a collection of the feedback control factor values and said special zone signal.

2. An internal combustion engine air-fuel ratio control apparatus as claimed in claim 1 wherein said control circuit includes means for indicating the operation of the engine in the predetermined zone, the indication being used to inhibit the updating of the adaptive update value data.

3. An internal combustion engine air-fuel ratio control apparatus as claimed in claim 1 wherein said control means includes a microprocessor and wherein an unused bit of a plural bit word is used to flag the instant engine operation falling the predetermined zone.

4. An internal combustion engine air-fuel ratio control apparatus as claimed in claim 1 wherein the adaptive update value is set to a predetermined level during the period that the updating is inhibited.

5. An internal combustion engine air-fuel ratio control apparatus as claimed in claim 1 wherein the adaptive update value is read out of data which is recorded in mapped form and stored in memory, the adaptive update value data which is stored in the section of the map which corresponds to said predetermined zone having a resolution which is different from the adaptive update value data which is stored outside thereof.

6. An internal combustion engine air-fuel ratio control apparatus as claimed in claim 5 wherein the adaptive update value data which falls in the section of the amp which corresponds to said predetermined zone is adapted to attenuate a predetermined engine operational phenomenon.

7. An internal combustion engine air-fuel ratio control apparatus as claimed in claim 1 wherein said memory has first and second sections, the first section containing a first type of adaptive update value data for use when the engine is operating in the predetermined zone, the second section containing a second type of adaptive update value data which is used when the engine is operating out of the predetermined zone, and wherein the control circuit is arranged to access first memory section during the time the engine operation falls in the predetermined zone.

8. An internal combustion engine air-fuel ratio control apparatus as claimed in claim 7 wherein the first type of adaptive update value data which is stored in the first memory section is updated in a second predetermined manner based on the engine speed and engine load while the engine operation falls in said predetermined zone and the updating of the second type of adaptive update value data stored in the second memory section in the first predetermined manner, is inhibited.

9. In an internal combustion engine a method of controlling the air-fuel ratio comprising:

sensing engine speed and engine load;

sensing the air-fuel ratio at a location upstream of a catalytic converter using a second air-fuel ratio sensor;

sensing the air-fuel ratio at a location downstream of a catalytic converter using a second air-fuel ration sensor;

supplying fuel into the engine;

using the air-fuel ratio sensed at the location upstream of the catalytic converter to determine a basic injection pulse width;

determining an air-fuel ratio feedback control factor value based on the output of said first air-fuel ratio sensor by a table look up using a stored data table;

determining an actual pulse width by correcting the basic pulse width using said air-fuel ration feedback control factor;

modifying said air-fuel ratio feedback control factor using an adaptive update value which is read out of memory, in a first predetermined manner based on the instant engine speed and load, and updated based on the output of said second air-fuel ratio sensor; and inhibiting the updating of adaptive update value in the event that a data element obtained by the table look up from said stored data table contains a special zone signal indicates that the engine is operating in a predetermined zone of engine parameters.

10. A method as claimed in claim 9 further comprising the step of producing an indication of the engine operating in the predetermined zone, the indication being used to inhibit the updating of the adaptive update value data.

11. A method as claimed in claim 9 further comprising the steps of using an unused bit of a plural bit microprocessor word to flag the instant engine operation falling the predetermined zone.

12. A method as claimed in claim 9 wherein the adaptive update value value is set to a predetermined level during the period the updating is inhibited.

13. A method as claimed in claim 9 further comprising the step of recording the adaptive update value data in mapped form and arranging the adaptive update value data which is stored in the section of the map which corresponds to said predetermined zone to have a resolution which is different from the adaptive update value data which is stored outside thereof.

14. A method as claimed in claim 13 further comprising the step of arranging the adaptive update value data which falls in the section of the map which corresponds to said predetermined zone to attenuate a predetermined engine operational phenomenon.

15. A method as claimed in claim 9 further comprising the steps of:
using a memory which has first and second sections;
storing a first type of adaptive update value data for use when the engine is operating in the predetermined zone in the first section;
storing a second type of adaptive update value data which is used when the engine is operative out of the predetermined zone, in the second section;
accessing the first memory section during the time the engine operation falls in the predetermined zone; and
updating the first type of adaptive update value data which is stored in the first memory section in a second predetermined manner based on the engine speed and engine load while the engine operation falls in said predetermined zone.

16. An air fuel ratio control system for an engine, said control system comprising:
an engine system comprising an engine, an exhaust gas conduit connected to said engine, and a catalystic converter disposed said exhaust gas conduit;
a sensor group comprising an engine load sensor for sensing an engine load of said engine, and engine speed sensor for sensing an engine speed of said engine, an upstream air fuel ratio sensor disposed in said exhaust gas conduit at a position upstream of said catalytic converter, and a downstream air fuel ratio sensor disposed in said exhaust gas conduit at a position downstream of said catalytic converter;
a fuel injecting means for supplying fuel to said engine in response to a control signal; and
a control unit for producing said control signal in accordance with sensor output signals produced by said sensor group, said control unit comprising a controlling means for:
producing said control signal representing a fuel supply quantity in accordance with a feedback correction quantity and a basic injection quantity which is determined by said engine load sensed by said engine load sensor and said engine speed sensed by said engine speed sensor;
determining a feedback control factor by obtaining a value of said feedback control factor from a map of a feedback control factor data table in accordance with the output of said upstream air fuel ratio sensor;
updating an adaptive variable in accordance with the output of said downstream air fuel ratio sensor;
determining said feedback correction quantity in accordance with said feedback control factor and said adaptive variable, and
inhibiting said adaptive variable from being updated in response to a special zone signal;
wherein said control unit comprises a storage means comprising a feedback control factor memory for storing said map of said feedback control factor data table determined in accordance with the engine speed and a second variable which is one of the engine load and the basic injection quantity, said feedback control factor memory comprising a normal zone memory section for storing values of said feedback control factor in a predetermined normal zone determined by the engine speed and said second variable, and a special zone memory section for storing special values of said feedback control factor in a predetermined special zone determined by the engine speed and said second variable, said feedback control factor memory further storing said special zone signal in said map;
wherein said storage means further comprises a normal learning memory which is subdivided into a plurality of memory sections each of which stores a collection of values of said adaptive variable in a unique one of a plurality of learning zones determined by the engine speed and said second variable, each of said learning zones being grater in area than said special zone.

17. An air fuel ratio control system for an engine, said control system comprising:
an engine system comprising an engine, an exhaust gas conduit connected to said engine, and a catalytic converter disposed in said exhaust gas conduit;
a sensor group comprising a sensor means for sensing first and second engine operating parameters of said engine, an upstream air fuel ratio sensor disposed in said exhaust gas conduit at a position upstream of said catalytic converter, and a downstream air fuel ratio sensor disposed in said exhaust gas conduit at a position downstream of said catalytic converter;
a fuel injection means for supplying fuel to said engine in response to a control signal; and
a control unit for producing said control signal in accordance with sensor output signals produced by said sensor group, said control unit comprising a controlling means for;
producing said control signal representing a fuel supply quantity in accordance with a feedback correction quantity and a basic fuel quantity which is determined by the first and second engine operating parameters sensed by said sensor means;
determining a feedback control factor by obtaining a value of said feedback control factor from a feedback control factor data table in accordance with an output of said upstream air fuel ratio sensor;
updating an adaptive variable in accordance with an output of said downstream airfuel ratio sensor;
determining said feedback correction quantity in accordance with said feedback control factor and said adaptive variable, and
inhibiting said adaptive variable from being updated in response to a special zone signal;
wherein said control unit comprises a storage means for storing said feedback control factor data table which contains values of said feedback control factor and said special zone signal.

18. An air fuel ratio control system according to claim 17
wherein said sensor means comprises an engine speed sensor for sensing said first engine operating parameter which is indicative of an engine speed of said engine, and an engine load sensor for sensing said second engine operating parameter which is indicative of an engine load of said engine;
wherein said controlling means comprises;
a first monitoring means for monitoring an output of said upstream airfuel ratio sensor, and producing a first discrimination signal in accordance with the output of said upstream air fuel ratio sensor;
a first table looking up means for determining said feedback control factor by obtaining one of a plurality of data elements of said control factor data table, said control factor data table comprising a collection of the data elements each of which is identified by a first argument corresponding to said engine speed and by a second argument corresponding to said engine load and said first discrimination signal;

a second monitoring means for monitoring an output of said downstream air fuel ratio sensor and producing a second discrimination signal in accordance with the output of said downstream air fuel ratio sensor;

a normal updating means for performing a normal update operation to update said adaptive variable in accordance with said second discrimination signal;

a feedback correction quantity determining means for modifying said feedback control factor in accordance with said adaptive variable, and for determining said feedback correction quantity in accordance with the feedback control factor modified in accordance with said adaptive variable; and an inhibiting means for preventing said normal update operation of said normal updating means when the data element obtained by said first table looking up means contains said special signal in a first signal state, and allowing said normal update operation when the data element obtained by said first table looking up means contains said special zone signal in a second signal state.

19. An air fuel ratio control system according to claim 18 wherein said storage means comprises a feedback control factor memory section for storing said feedback control factor data table which comprises a plurality of subdivided data tables, and a normal learning memory section for storing an adaptable variable data table which is a collection of values of said adaptive variable and which comprises a plurality of subdivided data tables;

wherein said first table looking up means includes a means for selecting one of the subdivided data tables of said feedback correction data table in accordance with said first discrimination signal, and for obtaining one of the data elements corresponding to said first and second arguments from a selected one of said subdivided data tables of said feedback correction data table;

wherein said controlling means further comprises a second table looking up means for selecting one of the subdivided data tables of said adaptive variable data table in accordance with said engine speed and said engine load, for determining said adaptive variable by obtaining a value of said adaptive variable corresponding to said engine speed and engine load from a selected one of said subdivided data tables of said adaptive data table, and for supplying a signal representing said adaptive variable to said feedback correction quantity determining means; and wherein said normal updating means includes a means for determining an updated value of said adaptive variable in accordance with said second discrimination signal and storing said updated value in said adaptive data table.

20. An air fuel ratio control system according to claim 19 wherein each of the data elements of said feedback control factor data table comprises a predetermined value of said feedback control factor and said special zone signal which can assume either of first and second possible values.

21. An air fuel ratio control system according to claim 20 wherein said control unit comprises a digital microprocessor, and each of the data element of said feedback control factor data table is in the form of a word which is an ordered set of bits one of which is used as said special zone signal.

22. An air fuel ratio control system according to claim 20 wherein said feedback control factor data table is so arranged that said feedback control factor is normally controlled at a normal level, and controlled at a special level for suppressing engine surging when an instantaneous engine operating condition determined by said first and second engine operating parameters is in a special engine operating zone; said feedback control factor data table contains a special group corresponding to said special zone; and each of the data elements belonging to said special group contains said special zone signal in said first signal state.

23. An air fuel ratio control system according to claim 20 wherein said first monitoring means includes a means for comparing the output of said upstream air fuel ratio sensor with a predetermined desired slice level and determining whether the air fuel ratio indicated by the output of said upstream air fuel ratio sensor is changed form one of rich and lean sides of said slice level to the other side, and said second monitoring means includes a means for comparing the output of said downstream air fuel ratio sensor with said predetermined desired slice level to determine whether the air fuel ratio indicated by the output of said downstream air fuel ratio sensor is on one of the rich and lean sides of said slice level or not; and wherein said normal updating means includes a means for replacing a stored value of said adaptive variable in one of memory locations in said learning memory section by the updated value each time said second monitoring means produces said second discrimination signal.

24. An air fuel ratio control system according to claim 23 wherein said inhibiting means comprises a means for resetting said adaptive variable to zero and causing said feedback control factor to be modified in accordance with the adaptive variable reset to zero when said special zone signal in the data element obtained by said first looking up means is in said first signal state.

25. An air fuel ratio control system according to claim 20 wherein said storage means further comprises a special learning memory section for storing values of a special update variable; and said inhibiting means comprises a special updating means for preventing said normal update operation of said normal updating means when the data element obtained by said first table looking up means contains said special signal in said first signal state, an instead for performing a special update operation to update one of the values of said special update variable stored in said special memory section in accordance with said second discriminating signal when the date element obtained by said first table looking up means contains said special signal in said first signal state.

26. An air fuel ratio control system according to claim 25 wherein said special updating means includes a means for determining an update value of said special update variable (SPHOS) by algebraically adding a predetermined special constant value (SPHOSL, SPHOSR), to a stored value of said special update variable stored in said special memory section, and said normal updating means includes a means for determining an update value of said adaptive variable (PHOS) by algebraically adding a predetermined normal constant value (DPHOS, DPHOSL) to a stored value of said adaptive variable stored in said normal leaning memory section.

27. An air fuel ratio control system according to claim 26 wherein said special constant value is equal to said normal constant value.

28. An air fuel ratio control system according to claim 26 wherein said special constant value (SPHOSL, SPHOSR) is smaller than said normal constant value (DPHOSR, DPHOSL).

29. An air fuel ratio control system according to claim 20 wherein said actuating means comprises a fuel injector; and said controlling means further comprises a control signal generating means for determining said fuel supply quantity (Ti) by multiplying said basic fuel quantity (Tp) by said feedback correction quantity ($\alpha$) which is determined in accordance with said feedback control factor which is a proportional control factor (PR, PL).

30. An air fuel control system according to claim 18 wherein said storage means comprises a feedback control factor memory for storing said feedback control factor data table, said feedback control factor memory comprising a special zone memory section for storing special values of said feedback control factor in a predetermined special zone determined by said first and second arguments, said special zone memory section further storing said special zone signal; and wherein said storage means further comprises a normal learning memory which is subdivided into a plurality of memory sections each of which stores a collection of values of said adaptive variable in a unique one of a plurality of learning zones determined by said first and second arguments, at least one of said learning zones being greater in area than said special zone.

31. An air fuel ratio control system according to claim 30 wherein said special zone is a zone in which said first argument is in a predetermined first range and at the same time said second argument is in a predetermined second range, and at least one of said learning zones is a zone in which said first argument is in a predetermined third range and said second argument is in a predetermined fourth range, and the area determined by said third range of said first argument and said fourth range of said second argument is greater than the area of said special zone determined by said first range of said first argument and said second range of said second argument.

* * * * *